(12) United States Patent
Lacroix et al.

(10) Patent No.: US 11,175,739 B2
(45) Date of Patent: Nov. 16, 2021

(54) METHOD AND DEVICE FOR PERFORMING ACTUATOR CONTROL BASED ON AN ACTUATOR MODEL

(71) Applicant: Immersion Corporation, San Jose, CA (US)

(72) Inventors: Robert A. Lacroix, Saint-Lambert (CA); Kaniyalal Shah, Fremont, CA (US); Christopher Ullrich, Ventura, CA (US); Juan Manuel Cruz-Hernandez, Montreal (CA); Danny A. Grant, Laval (CA)

(73) Assignee: IMMERSION CORPORATION, San Francisco, CA (US)

( * ) Notice: Subject to any disclaimer, the term of this patent is extended or adjusted under 35 U.S.C. 154(b) by 0 days.

(21) Appl. No.: 16/250,494

(22) Filed: Jan. 17, 2019

(65) Prior Publication Data
US 2019/0235628 A1 Aug. 1, 2019

Related U.S. Application Data

(60) Provisional application No. 62/622,648, filed on Jan. 26, 2018.

(51) Int. Cl.
*G06F 3/01* (2006.01)
*G06F 3/0484* (2013.01)
*G06F 3/0488* (2013.01)

(52) U.S. Cl.
CPC ............ *G06F 3/016* (2013.01); *G06F 3/01* (2013.01); *G06F 3/0484* (2013.01);
(Continued)

(58) Field of Classification Search
CPC combination set(s) only.
See application file for complete search history.

(56) References Cited

U.S. PATENT DOCUMENTS 7,843,277 B2 11/2010 Gregorio et al.
9,202,354 B2 12/2015 Lacroix et al.
(Continued)

FOREIGN PATENT DOCUMENTS

EP 2179799 A1 4/2010
JP 2009525175 A 7/2009
(Continued)

OTHER PUBLICATIONS

The Extended European Search Report issued in European Application No. 19153329.8, dated Aug. 8, 2019.
(Continued)

*Primary Examiner* — Sahlu Okebato
(74) *Attorney, Agent, or Firm* — Medler Ferro Woodhouse & Mills PLLC

(57) ABSTRACT

A user interface device having a haptic actuator, a sensor, a storage device, and a control circuit is presented. The sensor is configured to measure movement output by the haptic actuator. The control circuit is configured to apply a first drive signal to the haptic actuator to generate a first haptic effect, and to receive a sensor measurement that describes movement of the haptic actuator in response to the first drive signal, and to generate or update, based on the measurement, an actuator model that describes how the haptic actuator moves in response to drive signals. The control circuit is further configured to generate a second drive signal based on a desired movement for a second haptic effect and based on the actuator model, and to control the haptic actuator to generate the second haptic effect by applying the second drive signal to the haptic actuator.

18 Claims, 18 Drawing Sheets

(52) U.S. Cl.
CPC ........ *G06F 3/0488* (2013.01); *G06F 3/04847* (2013.01); *G06F 2203/014* (2013.01)

(56) References Cited

U.S. PATENT DOCUMENTS

| | | | |
|---|---|---|---|
| 9,513,709 B2 | 12/2016 | Gregorio et al. | |
| 9,520,036 B1 | 12/2016 | Buuck et al. | |
| 2010/0156818 A1* | 6/2010 | Burrough | G06F 3/016 345/173 |
| 2013/0106589 A1* | 5/2013 | Posamentier | G06F 3/016 340/407.1 |
| 2014/0132568 A1* | 5/2014 | Hirose | G06F 3/016 345/175 |
| 2015/0268722 A1* | 9/2015 | Wang | A63F 13/837 345/156 |
| 2016/0239089 A1 | 8/2016 | Taninaka et al. | |
| 2017/0357320 A1 | 12/2017 | Chaudhri et al. | |
| 2018/0059793 A1* | 3/2018 | Hajati | G06F 1/163 |
| 2018/0182212 A1* | 6/2018 | Li | G05D 19/02 |
| 2019/0005781 A1* | 1/2019 | Kobayashi | G01C 21/3652 |

FOREIGN PATENT DOCUMENTS

| | | | |
|---|---|---|---|
| JP | 2012226482 | A | 11/2012 |
| JP | 2013507059 | A | 2/2013 |
| JP | 2014081721 | A | 5/2014 |
| JP | 2014170534 | A | 9/2014 |
| JP | 2015084208 | A | 4/2015 |
| JP | 2016131018 | A | 7/2016 |
| JP | 2017126222 | A | 7/2017 |
| KR | 10-2013-0089211 | A | 8/2013 |
| WO | 2015083283 | A1 | 3/2017 |
| WO | 2018005590 | A1 | 1/2018 |

OTHER PUBLICATIONS

Hughes, et al., Electronic Motors and Drives, Newnes, (2013) pp. 95-98.

Chen et al., "Friction characterization and compensation of a linear-motor rolling-guide stage," International Journal of Machine Tools & Manufacture (2003) 43(9):905-915.

Office Action dated Apr. 28, 2020 in Japanese Patent Application No. 2019-010913 (with English translation).

The Partial European Search Report (R. 64 EPC) issued in European Application No. dated May 28, 2019.

* cited by examiner

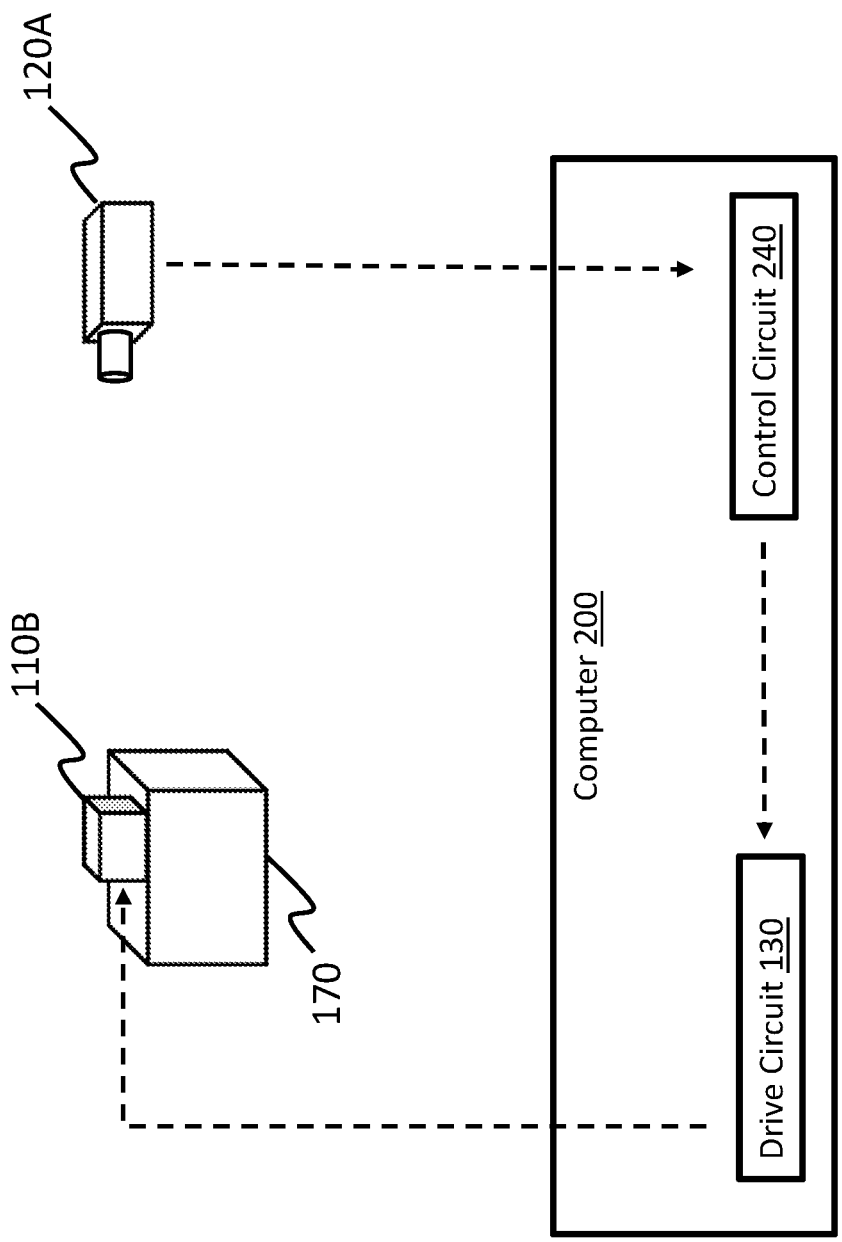

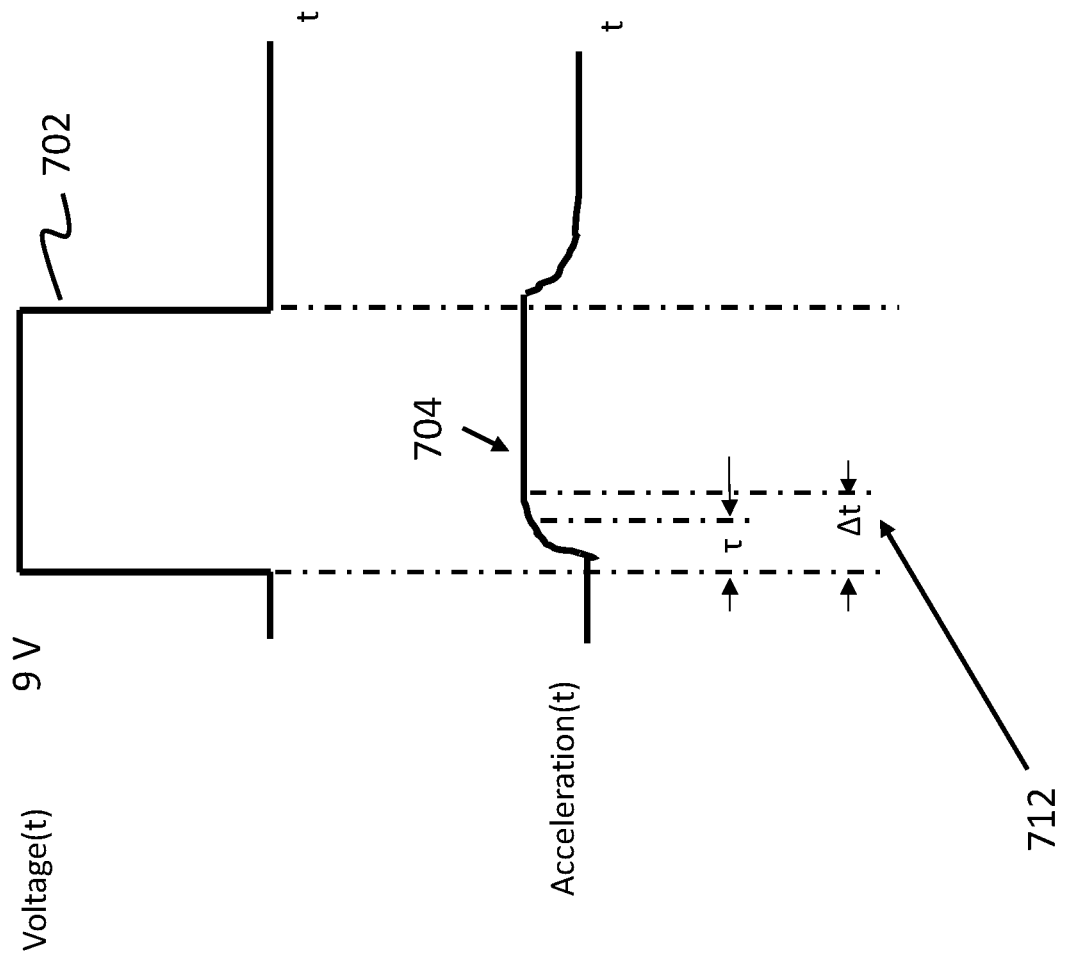

METHOD AND DEVICE FOR PERFORMING ACTUATOR CONTROL BASED ON AN ACTUATOR MODEL

CROSS REFERENCE TO RELATED APPLICATIONS

This application claims priority to U.S. Provisional Application No. 62/622,648, titled "METHOD OF ACTUATOR CONTROL BASED ON CHARACTERIZING of HAPTIC ACTUATOR" and filed on Jan. 26, 2018, the entire disclosure of which is incorporated herein in its entirety.

FIELD OF THE INVENTION

The present invention is directed to an apparatus, system, and method for performing actuator control based on an actuator model, and may be used for a mobile device, wearable electronic device, in-vehicle system, or other user interface device or other consumer electronics.

BACKGROUND

As electronic user interface systems become more prevalent, the quality of the interfaces through which humans interact with these systems is becoming increasingly important. Haptic feedback, or more generally haptic effects, can improve the quality of the interfaces by providing cues to users, providing alerts of specific events, or providing realistic feedback to create greater sensory immersion within a virtual environment. Examples of haptic effects include kinesthetic haptic effects (such as active and resistive force feedback), vibrotactile haptic effects, and electrostatic friction haptic effects. The haptic effects may be generated by generating a drive signal and applying the drive signal to a haptic actuator.

SUMMARY

One aspect of the embodiments herein relates to a user interface device that comprises a haptic actuator, a sensor, a storage device, and a control circuit. The sensor is configured to measure movement that is output by the haptic actuator. The control circuit is configured to apply a first drive signal to the haptic actuator to generate a first haptic effect, and to receive, from the sensor, a measurement that describes movement of the haptic actuator in response to the first drive signal. The control circuit is further configured to generate or update, based on the measurement, an actuator model that describes how the haptic actuator moves in response to drive signals, and to store the actuator model in the storage device. The control circuit is further configured to determine, after the actuator model has been generated or updated, that a second haptic effect is to be generated by the haptic actuator. The control circuit is also configured to generate a second drive signal based on a desired movement for the second haptic effect and based on the actuator model, and to control the haptic actuator to generate the second haptic effect by applying the second drive signal to the haptic actuator.

Features, objects, and advantages of embodiments hereof will become apparent to those skilled in the art by reading the following detailed description where references will be made to the appended figures.

BRIEF DESCRIPTION OF THE DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIGS. 1A-1D provide block diagrams illustrating systems for determining an actuator model of a haptic actuator for facilitating control of the haptic actuator, according to an embodiment hereof.

FIGS. 8A-8D illustrate example drive signals and measurements of acceleration output by a haptic actuator in response to the drive signals, according to embodiments hereof.

DETAILED DESCRIPTION

Figure 1A:
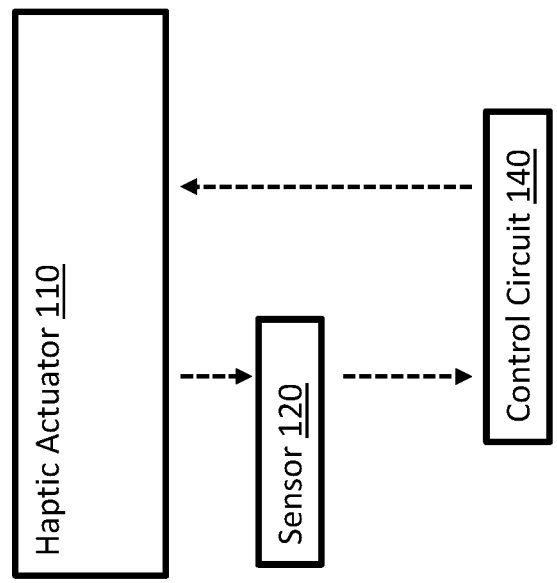

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments herein relate to facilitating control of a haptic actuator by generating an actuator model of the haptic actuator, wherein the actuator model describes characteristics of the haptic actuator. The characteristics may describe, for instance, how an output of the haptic actuator (e.g., acceleration) responds to an input (e.g., a drive signal). The characteristics may be expressed in various ways, such as through a parameter value that describes a behavior or property of the haptic actuator, a transfer function that describes the output of the haptic actuator as a function of the input, or in some other way. In some cases, information on the characteristics of the haptic actuator may be unavailable from a manufacturer or other supplier of the haptic actuator. In some cases, the manufacturer or other supplier may provide only a nominal parameter value or other nominal characteristic of the haptic actuator, and the nominal parameter value may not be sufficiently accurate in characterizing the haptic actuator. For instance, the haptic actuator may belong to a particular type of haptic actuators that were not manufactured to an extremely tight tolerance, in order to keep cost low for the haptic actuators. In such an instance, a considerable amount of variation may exist among the haptic actuators that were manufactured, even though they belong to the same type of haptic actuators. Further, a characteristic of the haptic actuator may change over time as a result of age, excessive use, or some other factor. Thus, although the manufacturer may provide a nominal parameter value or other nominal characteristic for a particular type of haptic actuators, individual haptic actuators belonging to that type may have characteristics that deviate from the nominal parameter value. Such deviations may increase the difficulty of controlling individual haptic actuators to generate precise, sharp haptic effects because different haptic actuators may behave differently in response to the same input (e.g., the same drive signal). For instance, although different haptic actuators from the same manufacturer are nominally identical, they may actually accelerate at different respective rates in response to the same drive signal, exhibit different respective levels of inductance or moments of inertia, or have different respective resonance frequencies. Accordingly, embodiments herein relate to characterizing individual haptic actuators so as to determine actual characteristics for a specific haptic actuator. Information from that characterization, which may be in the form of an actuator model, can be used to more precisely control that specific haptic actuator. For example, a drive signal or other input for a particular haptic actuator can be adapted to the specific characteristics of that haptic actuator. In some cases, characterizing the haptic actuator may be especially useful in later using the haptic actuator to generate a short haptic effect, which may involve only one or two cycles of oscillation, or which may terminate before the haptic actuator has even reached a steady state response or peak response.

In some cases, the determined characteristics of a haptic actuator may be used to facilitate open-loop control the haptic actuator, which may also be referred to as a feedforward control. For instance, the determined characteristics may be used to determine a parameter value of a drive signal, such as an amplitude, frequency, or duration of the drive signal, or whether the drive signal has a kick-in portion of a braking portion. The open-loop control may be used by itself (such that the haptic actuator is controlled in a completely open-loop manner), or in combination with closed-loop control.

As stated above, in some cases the characteristics of a haptic actuator may be reflected in an actuator model of the haptic actuator. In an embodiment, the actuator model may specify values for parameters that describe a relationship between an input to the haptic actuator and an output of the haptic actuator. For instance, the parameters may indicate electrical and/or mechanical properties of the haptic actuator, as discussed below in more detail. Further, the actuator model may be specific to that haptic actuator. Thus, different haptic actuators may have respective actuator models that specify different parameter values or different transfer functions, even though the haptic actuators all belong to the same type of haptic actuator.

In an embodiment, the process of determining the characteristics of a haptic actuator may be done at any of various stages of production or use. For instance, the characteristics of the haptic actuator may be determined within a factory, by a manufacturer of the haptic actuator as part of the manufacturing process. In this situation, information that is determined from the characterization may be stored within the haptic actuator, stored on a database, or processed in some other manner.

In some cases, the characteristics of the haptic actuator may be determined during use, after the haptic actuator has been incorporated into a user interface device that is an end user device (also referred to as end user product). Examples of such a user interface device include a mobile phone, game controller, wearable device (e.g., smart watch), interactive vehicle dashboard or other in-vehicle system, or other user interface device. In these cases, the process of determining the characteristics of the haptic actuator may be initiated by, e.g., a device driver or operating system being executed on the user interface device. The process may be performed only once, or may be done over a lifetime of the haptic actuator. For example, the characterization process may be performed periodically, after a defined number of days since the characteristics of the haptic actuator were most recently determined, after a defined number of rendered haptic effects since the characteristics of the haptic actuator were most recently determined. In some cases, the latter condition may count only haptic effects that were sufficiently long. In other words, the characterization of the haptic actuator may be triggered when a defined number of haptic effects that are longer than a defined duration have been performed since the characteristics of the haptic actuator were most recently determined. By performing the characterization of the haptic actuator multiple times over its lifetime, any change to a behavior of the haptic actuator, and more specifically to how the haptic actuator responds to input, may be detected. Such changes may arise from aging of the haptic actuator, or from environmental changes, such as a change in temperature or a change in a load placed upon the haptic actuator. Moreover, performing the characterization of the haptic actuator at different points through a lifetime of the haptic actuator may also improve an accuracy of an actuator model, because the actuator model is generated from more measurements that cover a longer time span, including more recent measurements.

In an embodiment, an actuator model of a haptic actuator may indicate values for parameters that describe a mechanical property or electrical property of the haptic actuator. For instance, the parameters may include an inductance, resistance, mass, moment of inertia, and damping factor of the haptic actuator. In an embodiment, the actuator model may include a transfer function, such as a function describing $$\frac{output\_acceleration(t)}{input\_voltage(t)}.$$

In some cases, the actuator model may describe components of the haptic actuator. For instance, the actuator model may indicate that haptic actuator includes a spring, an electromagnetic coil, a motor, or a layer of piezoelectric material. The actuator model may further indicate a value of a parameter for such components, such as a spring constant K. In some implementations, the actuator model may indicate a structure of the haptic actuator.

The actuator model may in an embodiment be a simplified representation of the components or characteristics of the haptic actuator. For example, the actuator model may assume that an effect of inductance or inertia of components within the haptic actuator is negligible, which may allow the actuator model to ignore second-order or higher-order effects that may be caused by the inductance or inertia. In such an embodiment, the actuator model may represent only first order effects that may be caused by the components or characteristics of the haptic actuator.

In an embodiment, the actuator model may be at least a transient model for the haptic actuator. The transient model describes at least a transient characteristic of the haptic actuator (the term transient characteristics may also be referred to as transient dynamics). The transient characteristic for a particular haptic actuator may describe, e.g., how quickly the haptic actuator responds to an input, such as a drive signal. The quickness of the response may refer to, e.g., how long the haptic actuator takes to output any movement, how quickly the haptic actuator moves or oscillates, how quickly the haptic actuator accelerates or changes acceleration, how quickly the haptic actuator changes vibration amplitude, or any other parameter for describing quickness of response. In some cases, the transient characteristics may be indicate the response of the haptic actuator in a short time period immediately after the input is applied, before the haptic actuator has reached a peak response or steady state response. For instance, this time period may focus on how much acceleration is being output by the haptic actuator, as a function of time, before the acceleration has reached a peak value or a steady state value. In an embodiment, the time period may be a period that lasts no longer than a nominal rise time of the haptic actuator. The nominal rise time may be, e.g., a manufacturer-provided value that specifies how long the haptic actuator takes to reach a peak response or steady response as a result of being applied with a drive signal of a particular amplitude (e.g., a defined rated maximum amplitude, such as a defined rated maximum voltage). In this example, the time period may begin at the same time as a start of an input drive signal, and end after the nominal rise time of the haptic actuator elapses. The transient characteristic in this example may measure how quickly an acceleration from the haptic actuator increases in this time period.

In an embodiment, a transient characteristic of a haptic actuator may be described through one or more inertial properties of the haptic actuator that buffer a reaction of the haptic actuator to an input. Such inertial properties may include, e.g., an inductance that creates a first time delay between a start of a voltage input signal and flow of electrical current into the haptic actuator as a result of the voltage input signal, or a moment of inertia that creates a second time delay between a start of the electrical current generating a force or torque and a start of the haptic actuator outputting movement.

In an embodiment, the transient characteristic may include or be based on an electrical transient characteristic of the haptic actuator. The electrical transient characteristic may describe, e.g., how long the haptic actuator takes to begin drawing electrical current or change an amount of electrical current being drawn in response a voltage drive signal or other input. This characteristic may also be described as an amount of time needed by a voltage signal to drive electrical current into the haptic actuator. In an embodiment, the electrical transient characteristic may be described through parameters that represent electrical characteristics (also referred to as electrical properties) of the haptic actuator (e.g., inductance and resistance), through a time constant that describes rise time or decay time, or through some other manner. The time constant may be associated with, e.g., a defined voltage amplitude or current amplitude. In an embodiment, the haptic actuator may include an armature (e.g., motor armature) or a component that is analogous to an armature. In such an embodiment, the electrical transient characteristics may be referred to as an armature transient characteristic, and the time constant discussed above may be referred to as an armature transient time constant.

In an embodiment, the transient characteristic may include or be based on a mechanical or electromechanical transient characteristic of the haptic actuator. The mechanical or electromechanical transient characteristic may describe, e.g., how long the haptic actuator takes to output movement or a change in movement in response a force or torque being generated within the haptic actuator. The force or torque may be generated by, e.g., electrical current drawn by the haptic actuator in response to a voltage signal. In an embodiment, the mechanical transient characteristic may be described through a parameter such as mass, moment of inertia, or a damping factor that approximates or otherwise represents mechanical characteristics of the haptic actuator, through a time constant that describes rise time or decay time for movement or change in movement being output by the haptic actuator or a component thereof, or may be described in some other manner.

In an embodiment, the actuator model for a particular haptic actuator may be limited to a transient model that describes only one or more transient characteristics of the haptic actuator. In an embodiment, the model may further include information that describes steady state characteristics of the haptic actuator. In an embodiment, if the haptic actuator includes a component or structure (e.g., a spring) that is configured to generate a vibration, the model may describe one or more resonant frequencies of that component or structure, or more generally of the haptic actuator.

In an embodiment, an actuator model of a particular haptic actuator may facilitate control of the haptic actuator in a more open loop manner (also referred to as a feed forward manner), and in a less closed loop manner. Closed-loop control may involve use of real-time feedback to adjust an output of the haptic actuator. In some cases, the closed-loop control does not need any information on the characteristics of the haptic actuator. For some situations, optimal operation of the closed-loop control may rely on a high rate of adjustment (e.g., higher than 1 kHz), a high rate of measurement, a high-quality sensor that provides precise measurements, and/or a high-quality haptic actuator that can quickly adjust its output in a precise manner. For instance, if a desired duration for a haptic effect is short to begin with, the haptic effect may already be over before the closed-loop control alone can sufficiently cause the output of the haptic actuator to converge to a desired output, especially if the rate of adjustment for the closed-loop control is slow. The short haptic effect may, e.g., be used to simulate a button click. In such a situation, a desired output from the haptic actuator may include a short and crisp movement, such as an oscillation with a desired duration of no more than one cycle or two cycles, and that abruptly ends after the desired duration elapses. As stated above, achieving such an output with closed-loop control may be difficult, or may involve a high-quality sensor and/or a high-quality haptic actuator, which may increase cost. In an embodiment, the actuator model may be used to facilitate control of a haptic actuator to generate such a desired output, even when the haptic actuator is of only average or low quality. More particularly, because the actuator model of the haptic actuator includes information on the haptic actuator's characteristics, such as the transient characteristics described above, such characteristics may be used to generate a drive signal that takes such characteristics into account. Because the drive signal is generated based on the haptic actuator's characteristics, as well as based on a desired output, it may be more likely to cause the haptic actuator to achieve the desired output. In some cases, the drive signal may be used for completely open-loop control (also referred to as feed forward control), in which the drive signal is applied to the haptic actuator without adjusting the drive signal in real-time based on closed-loop feedback. In some cases, the drive signal may be used with a combination of open-loop control and closed loop control, in which the drive signal is initially generated based on an actuator model, and then is adjusted in real-time based on closed-loop control. Because the drive signal was initially generated based on the actuator model, such a drive signal may lead to an output that is already close to a desired output, even without adjusting the drive signal. Thus, the amount of adjustment to the drive signal for achieving the desired output may be relatively small. As a result, if the open-loop control were combined with closed loop control, the closed loop control may be able to more quickly adjust the drive signal to a point at which an output of the haptic actuator converges to the desired output.

FIG. 1A illustrates a system 100 that may be used to determine an actuator model of a haptic actuator 110, which may facilitate control of the haptic actuator 110. More specifically, the system 100 includes the haptic actuator 110, a sensor 120, and a control circuit 140. In an embodiment, the control circuit 140 may be configured to use the sensor 120 to determine an actuator model of the haptic actuator 110. As discussed in more detail below, the system 100 may be part of a manufacturer's system for determining characteristics of the haptic actuator 110, may be part of a user interface device for controlling the haptic actuator 110 (which may be embedded within the user interface device), or some other system. In an embodiment, the control circuit 140 is configured to also subsequently control the haptic actuator 110 based on the actuator model.

In an embodiment, the haptic actuator 110 may be a linear resonant actuator (LRA), a linear motor, an eccentric rotating mass (ERM) actuator, a piezoelectric actuator, an electroactive polymer (EAP) actuator, a voice coil actuator, or any other haptic actuator. In an embodiment, the sensor 120 may include an accelerometer, a position sensor (e.g., a sensing coil), a vibrometer, an electrical current sensor, a zero crossing sensor, any other sensor, or a combination thereof. The control circuit 140 may be configured to receive, from the sensor 120, a measurement that describes movement of the haptic actuator 110. For instance, the control circuit 140 may be configured to receive a value of an acceleration being output by the haptic actuator 110. The sensor 120 may integrated into the haptic actuator such that it is a part of the haptic actuator 110, or may be part of the control circuit 140, or may be a standalone component separate from the haptic actuator 110 and the control circuit 140.

In an embodiment, the control circuit 140 may include one or more processors, one or more processor cores, a programmable logic array (PLA), a field programmable gate array (FPGA), an application specific integrated circuit (ASIC), a microcontroller, or any other control circuit. In an embodiment, the control circuit 140 may be a general purpose processor, such as a general purpose processor on a mobile phone or other end user device, or may be a processor dedicated to controlling haptic feedback.

Figure 1B:
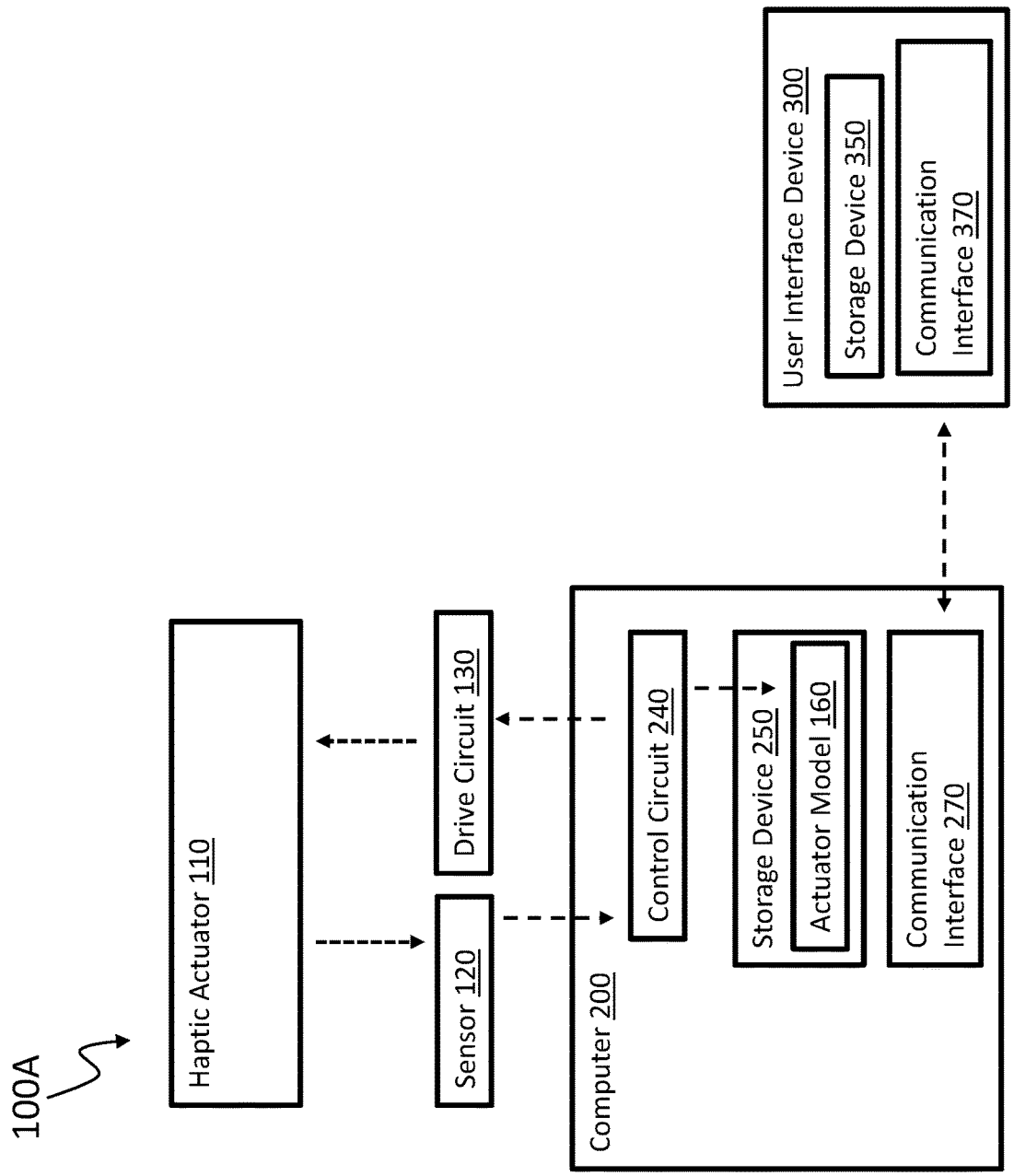

FIG. 1B depicts a system 100A that is an embodiment of system 100. The system 100A may be, e.g., part of a factory in which a manufacturer of the haptic actuator 110 determines an actuator model of the haptic actuator 110. The system 100A includes the haptic actuator 110, a sensor 120, a drive circuit 130, and a computer 200.

In an embodiment, the computer 200 may be, e.g., a computer that is configured to perform quality control testing or measuring of haptic actuators at the factory. The computer 200 may include a control circuit 240, a storage device 250, and a communication interface 270. In an embodiment, the control circuit 240 may be an embodiment of the control circuit 140, and may be used to determine an actuator model 160 of the haptic actuator 110. The storage device 250 may be used to store the actuator model 160. The storage device 250 may include, e.g., dynamic random access memory (DRAM), solid state memory, a hard disk drive (HDD), a tape drive, or any other storage device. The communication interface 270 may be configured to communicate the actuator model to a database, or to a user interface device 300, as depicted in FIG. 1B. For instance, the user interface device 300 may be a mobile phone that includes a storage device 350 and a communication interface 370. The user interface device 300 may be configured to receive the actuator model 160 from the computer 200, or from a database to which the actuator model 160 has been uploaded, and to store the actuator model 160 in the storage device 350.

In an embodiment, the system 100A includes a drive circuit 130, which may act as a buffer or amplifier for the control circuit 240, and may assist the control circuit 240 in generating a voltage signal, a current signal, or other drive signal. In some cases, the drive circuit 130 may be part of the control circuit 240. In other cases, the drive circuit 130 may be a standalone component, such as a driver integrated circuit (a driver IC). As discussed in more detail below, the control circuit 240 may be configured to apply, via the drive circuit 130, a drive signal to the haptic actuator 110, and to receive, from the sensor 120, a measurement that describes a movement being output by the haptic actuator 110 in response to the drive signal. The control circuit 240 may be configured to generate an actuator model 160 based on the measurement, and to store the actuator model 160 in the storage device 250.

Figure 1C:
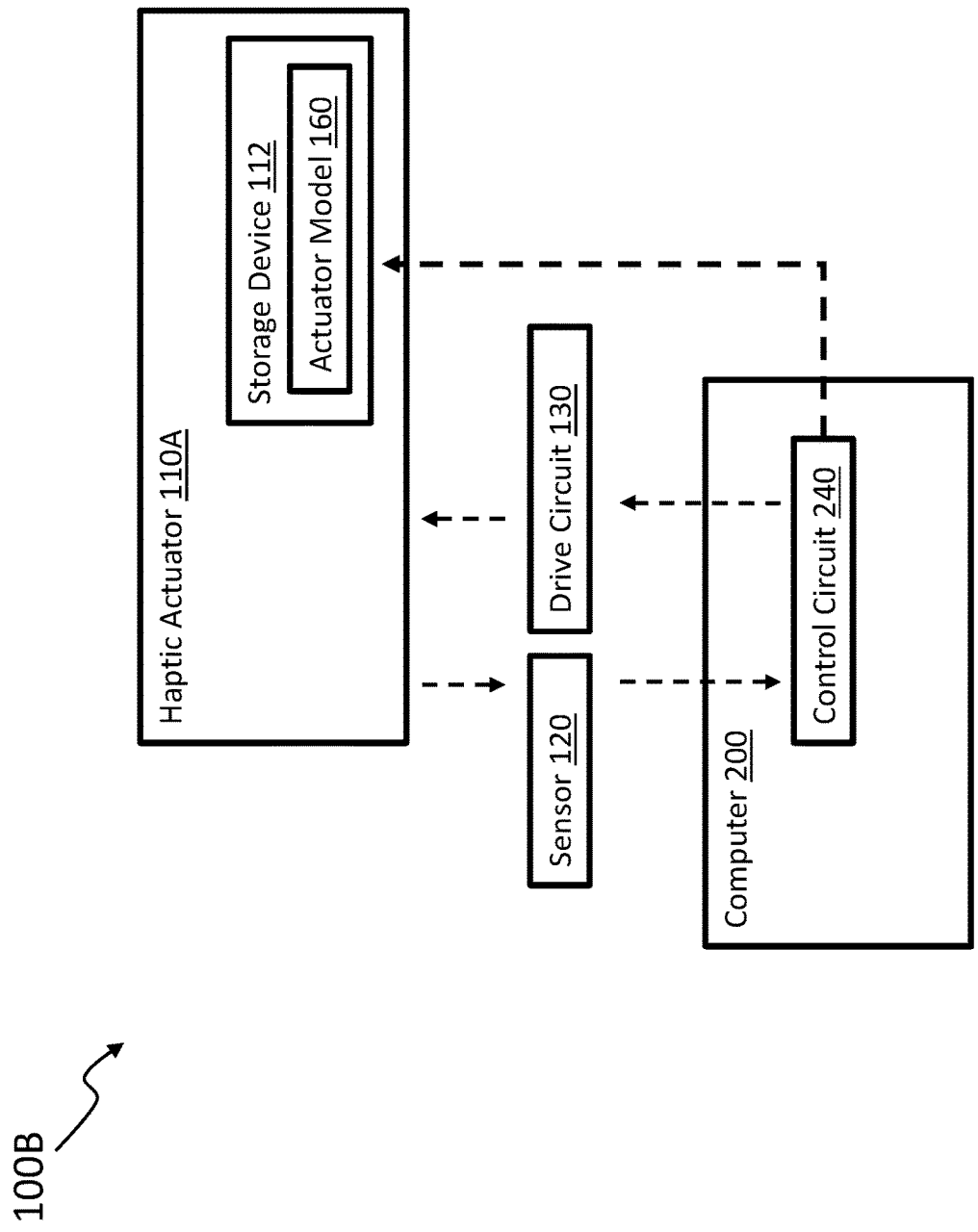

FIG. 1C depicts a system 100B that may be an embodiment of the system 100. The system 100B includes a haptic actuator 110A, the sensor 120, the drive circuit 130, and the computer 200. The haptic actuator 110A may be an embodiment of the haptic actuator 110. In the embodiment of FIG. 1C, the haptic actuator 110A may include a storage device 112 for storing the actuator model 160. When the haptic actuator 110A is incorporated into, e.g., a user interface device such as a mobile phone, the user interface device may be configured to access the actuator model 160 via the storage device 112. In an embodiment, the storage device 112 may include, e.g., solid state memory or programmable read-only memory (PROM).

FIG. 1D illustrates an example set-up for determining an actuator model of a haptic actuator. The example set-up includes a haptic actuator 110B that is an embodiment of the haptic actuator 110. In an embodiment, the haptic actuator 110B is mounted to a component 170 that simulates a load on the haptic actuator 110B. For instance, the component 170 may be a block having a mass of 100 g. The example set-up further includes a sensor 120A, which may be an embodiment of the sensor 120. For instance, the sensor 120A may be a vibrometer configured to measure vibrating motion being output by the haptic actuator 110B. The example set-up may additionally include the computer 200, which may include the control circuit 240 and the drive circuit 130. The control circuit 240 may be configured to control the drive circuit 130 to apply a drive signal to the haptic actuator 110B, and to receive a measurement of the resulting output of the haptic actuator 110B from the sensor 120A.

Figure 2:
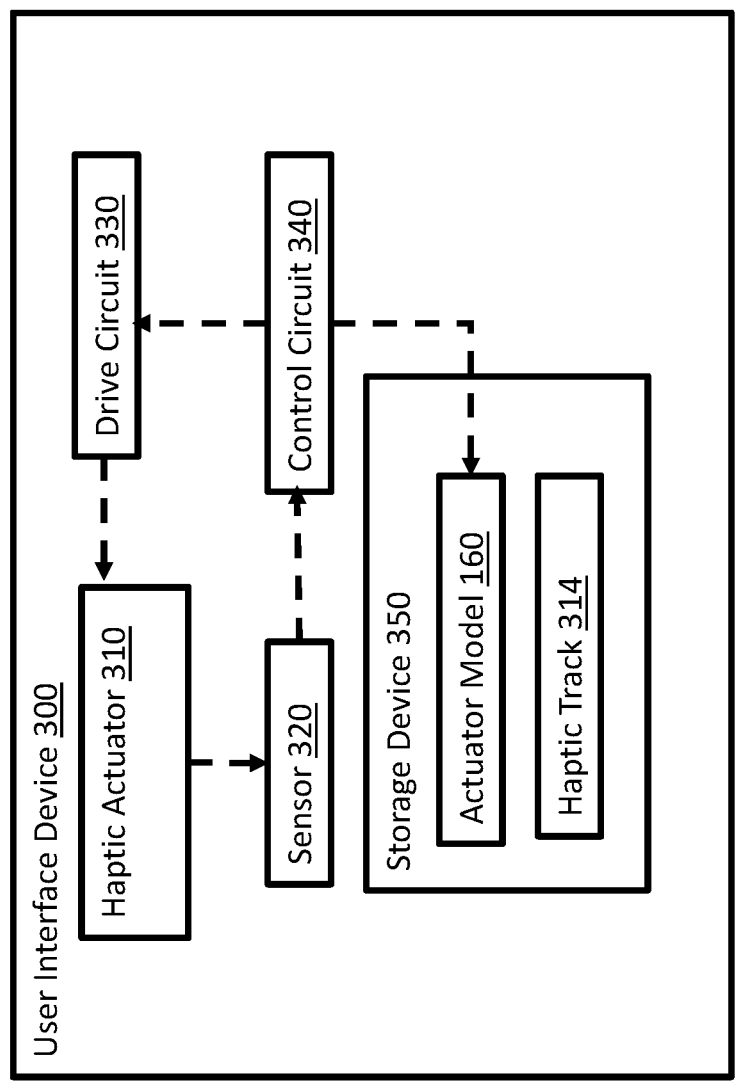
FIG. 2 provides a block diagram of a user interface device configured to generate or update an actuator model and to generate a haptic effect based on the actuator model, according to embodiments hereof.

As stated above, in some cases the actuator model may be determined by a user interface device. FIG. 2 illustrates an user interface device 300 that may be configured to generate or update the actuator model 160. The user interface device 300 may be, e.g., a mobile phone or tablet computer, a game console controller, a wearable device such as an electronic watch or head-mounted device (HIVID), a virtual reality (VR) or augmented reality (AR) device, an in-vehicle system such as an entertainment system controlled through a vehicle dashboard or center console, or any other user interface device.

As depicted in FIG. 2, the user interface device 300 includes a haptic actuator 310, a drive circuit 330, a sensor 320, a control circuit 340, and a storage device 350. The haptic actuator 310, drive circuit 330, and sensor 320 may be an embodiment of the haptic actuator 110, drive circuit 130, and sensor 120, respectively. In an embodiment, the user interface device 300 may include a touch screen that is configured to display a virtual button, and the haptic actuator 310 may be used to provide haptic feedback to simulate the mechanical feeling of clicking the virtual button. The storage device 350 may be a non-transitory computer-readable medium, and may include a dynamic random access memory (RAM), a hard disk drive (HDD), solid state memory, or any combination thereof. In an embodiment, the storage device 350 may store computer-executable instructions for performing the functions herein, and the computer-executable instructions may be executed by the control circuit 340.

In an embodiment, the control circuit 340 may drive the haptic actuator 310 via the drive circuit 330, and measure a response of the haptic actuator 310 via the sensor 320. The control circuit 340 may use the response to generate or update an actuator model 160, which may then be stored by the storage device 350. In an embodiment, the control circuit 340 and the storage device 350 may both be part of a microcontroller that is dedicated to performing low-level control of the haptic actuator 310. For instance, the control circuit 340 may receive a high-level command from a user application to generate a haptic effect, and may convert the high-level command to a drive signal. In an embodiment, the storage device 350 may store a device driver for controlling the haptic actuator 310, and the actuator model 160 may be stored as part of the device driver. In an embodiment, the user interface device 300 may be configured to update the actuator model 160 at different points in time.

In the embodiment of FIG. 2, the control circuit 340 may be configured to use the actuator model 160 to generate a drive signal for a haptic effect. In some cases, the drive signal may be generated based on the actuator model 160 and a haptic track 314 stored on the storage device 350. The haptic track 314 may describe a desired movement for the haptic effect. For instance, the haptic track 314 may specify, e.g., a duration, amplitude (e.g., peak-to-peak amplitude), and/or frequency for the haptic effect. In some cases, the haptic track 314 may describe an acceleration waveform that specifies a desired acceleration for the haptic effect as a function of time. In some cases, the haptic track may specify a desired velocity or desired position for the haptic effect as a function of time. The desired acceleration, velocity, or position may, for instance, be measured with respect to a load being moved by the haptic actuator 310, such as a touch screen of the user interface device 300. In an embodiment, the control circuit 340 may update the actuator model 160 based on measurements from the sensor 320, as represented by the dashed lines in FIG. 2.

Figure 3:
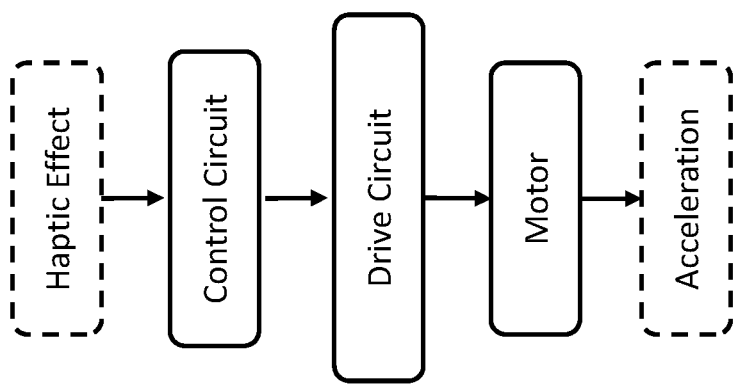
FIG. 3 provides a diagram that illustrates open loop control of a haptic actuator, according to an embodiment hereof.
Figure 4B:
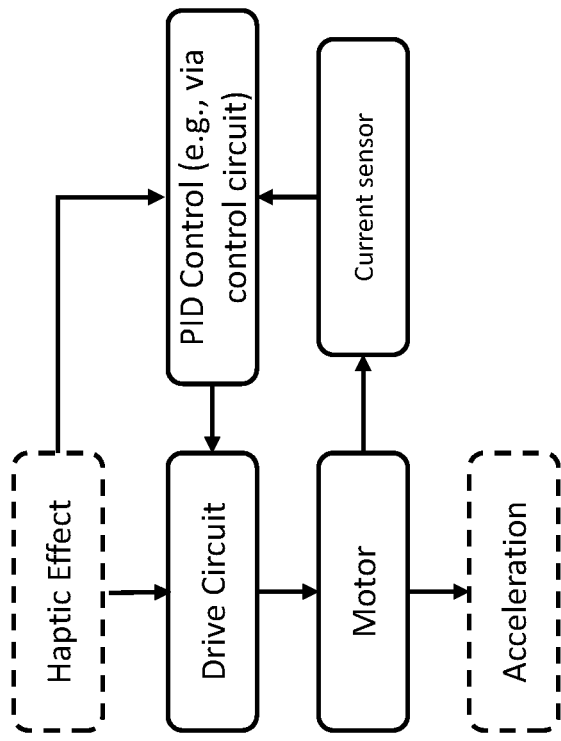
FIGS. 4A and 4B provide diagrams that illustrate closed loop control of a haptic actuator, according to an embodiment hereof.
Figure 4A:
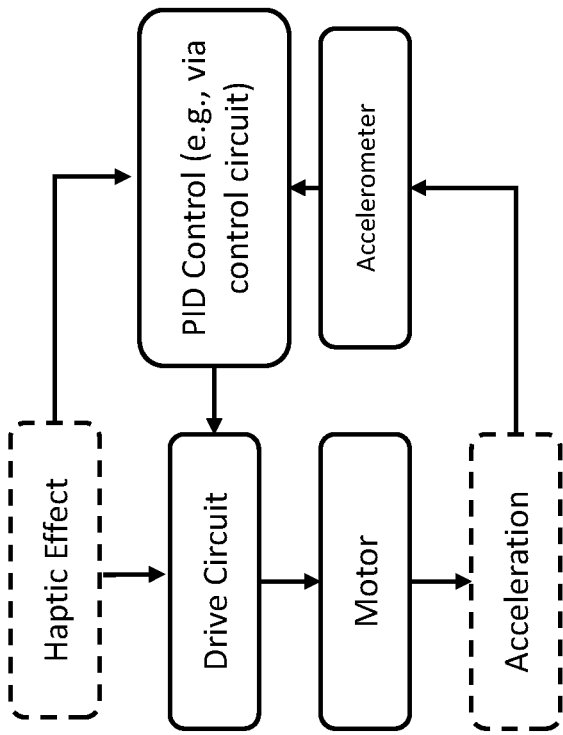

While embodiments herein relate to generating and using an actuator model to better generate a haptic effect, FIGS. 3, 4A, and 4B provide diagrams that illustrate scenarios in which a haptic actuator is controlled without determining an actuator model of the haptic actuator. FIG. 3 provides a diagram that illustrates an open-loop control of a haptic actuator without determining an actuator model, while FIGS. 4A and 4B illustrate a closed-loop control of a haptic actuator without determining an actuator model.

More specifically, the haptic actuator in FIG. 3 may include a motor, which may output acceleration. In FIG. 3, a control circuit may generate a drive signal based on a desired haptic effect, or more specifically based on a desired movement for the haptic effect. The desired movement may be specified in, e.g., a haptic track. The control circuit may generate the drive signal via a drive circuit, such as a driver integrated circuit (IC) chip. In some cases, the control circuit may also be part of the driver IC chip. The driver IC applies the drive signal to the motor, which causes the motor to output acceleration.

In the example of FIG. 3, the drive signal may be generated without the control circuit determining an actuator model of the motor. For instance, the drive signal may be a defined signal already stored on a storage device. The control circuit may then simply retrieve the drive signal from the storage device. In another example, the drive signal may be generated based on a nominal characteristic of the motor. The nominal characteristic may have been, e.g., a parameter value preprogrammed into the control circuit. As discussed above, however, the actual characteristic for a particular motor may deviate from the nominal characteristic of the motor, because even though a particular manufacturer may manufacture many motors that are nominally the same, those motors may actually exhibit differences unless they were all manufactured to an extremely tight tolerance. As a result, if the drive signal is generated based on the nominal characteristic of the haptic actuator, it may cause the motor to output an actual acceleration that deviates from a desired or otherwise intended acceleration for the haptic effect.

FIG. 4A depicts a block diagram of a closed loop control of a motor based a measurement of how the motor is accelerating, or on how a load attached to the motor is accelerating. More specifically, the haptic FIG. 4A depicts a control circuit that is configured to apply, via a drive circuit, a drive signal to control a motor to output acceleration. FIG. 4A further depicts an accelerometer that may measure the acceleration being output by the motor in real-time, and provide a measurement of the acceleration to the control circuit. The control circuit may implement proportional-integral-derivative (PID) control scheme to adjust the drive signal based on the measurement of the acceleration. More generally, the control circuit may implement a proportional control scheme, a proportional derivative (PD) control scheme, a proportional integral (PI) control scheme, or a proportional-integral-derivative (PID) control scheme. In an embodiment, the control circuit may use the measurement of the acceleration to determine a deviation (also referred to as an error) between the acceleration being output by the motor and a desired acceleration. The control circuit may adjust the drive signal based on a value of the error or a proportion of that value, rate of change of the error (e.g., a derivative of the error), a cumulative amount of error (e.g., an integral of the error), or a combination thereof, so as to compensate for the error. In an embodiment, the control circuit may adjust the drive signal based specifically on only a proportion of the value of the error, only a derivative of the error, or only a combination of the proportion and the derivative of the error.

FIG. 4B depicts a block diagram of closed loop control of the motor based on measurements from a current sensor, which may measure an amount of electrical current being drawn by the motor. In some instances, the control circuit may be configured to estimate the acceleration being output by the motor based on the measurements from the current sensor. In an embodiment, the measurements from the current sensor may replace or augment the measurements from the accelerometer.

Figure 5:
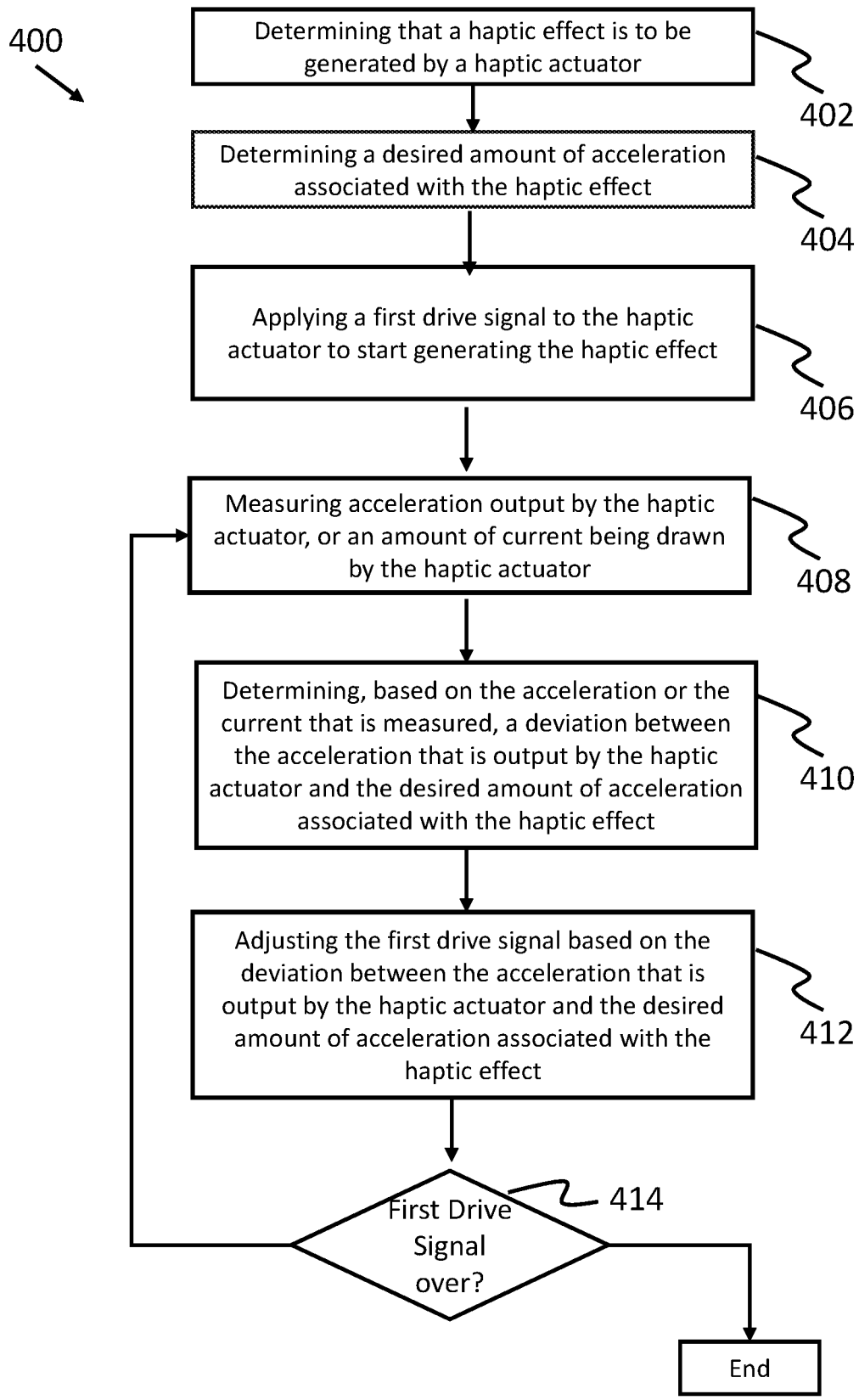
FIG. 5 illustrates a method for controlling a haptic actuator in a closed loop manner, according to an embodiment hereof.

FIG. 5 provides a flow diagram that illustrates an example method 400 that uses closed loop control to control a haptic actuator. In some cases, the method 400 may be based on the approach illustrated in FIGS. 4A and 4B. The method 400 may be performed by a control circuit, such as control circuit 140/240/340. In an embodiment, the method 400 may be performed by a device driver, which may be implemented through computer-executable instructions, such as instructions stored in the storage device 250/350.

In an embodiment, the method 400 begins at step 402, in which the control circuit 140/240/340 determines that a haptic effect is to be generated by a haptic actuator 110/310. For instance, the control circuit 140/240/340 may determine that a virtual button of a user interface device 300 has been pressed, and that the pressing of the virtual button is a triggering condition for the haptic effect. In step 404, the control circuit 140/240/340 determines a desired amount of acceleration associated with the haptic effect. For instance, a storage device 350 may store a haptic profile that defines a desired amount of acceleration associated with the haptic effect.

In step 406, the control circuit 140/240/340 applies a first drive signal, such as a voltage signal, to the haptic actuator to start generating the haptic effect. The first drive signal may be generated without taking into account the characteristic of the haptic actuator 110/310, or may alternatively be generated based on a characteristic of the haptic actuator 110/310, wherein the characteristic may be described in an actuator model 160 of the haptic actuator. In an embodiment, the first drive signal in step 406 may generate a starting portion of the haptic effect, wherein the starting portion may be a portion corresponding to a starting time period for the haptic effect. In an embodiment, step 406 may involve applying only a starting portion of the first drive signal, corresponding to the starting time period for the haptic effect. For instance, if the first drive signal is represented as a voltage waveform v(t), step 406 may involve applying a portion of the first drive signal from t=0 to t=2 ms. In some cases, the first drive signal may be represented as a sequence of discrete voltage signal values, and step 406 may involve applying a subset of voltage signal values that are at a start of the sequence.

In an embodiment, steps 408 through 414 may be performed to adjust the first drive signal for a remaining portion of the first drive signal, which may also be a remaining time period of the haptic effect. For instance, if the first drive signal is a stored signal that extends from t=0 to t=100 ms, or if the haptic effect has a desired duration of 100 ms, the remaining portion of the first drive signal may be a time period from t=2 ms to t=100 ms. Steps 408 through 414 may provide real-time feedback that provides closed-loop control, which may make adjustments to a drive signal as the haptic effect is being generated. In some cases, steps 408 through 414 may be performed over a plurality of iterations, at a rate of at least 1 kHz (i.e., once every millisecond) or at least 10 kHz.

In step 408, the control circuit 140/240/340 may measure acceleration that is output by the haptic actuator 110/310, or an amount of electrical current being drawn by the haptic actuator 110/310. The acceleration in step 408 may be determined based on, e.g., a measurement from an accelerometer, a current sensor, or other sensor. In step 410, the control circuit 140/240/340 may determine, based on the acceleration or the electrical current that is measured, a deviation between the acceleration that is output by the haptic actuator and the desired amount of acceleration associated with the haptic effect. In step 412, the control circuit may adjust the first drive signal based on the deviation between the acceleration that is output by the haptic actuator and the desired amount of acceleration associated with the haptic effect. For instance, if step 412 is performed at t=2 ms, the step may involve adjusting a signal value (e.g., voltage value) of the first drive signal at t=2 ms, such as by increasing or decreasing the signal value by an amount that is based on the deviation determined in step 410 (e.g., based on a rate of change of the deviation). The signal value may have already been determined in step 406, which may determine a plurality of signal values for the first drive signal, corresponding to different instances in time. These signal values may then be adjusted in step 412 over a plurality of iterations based on, e.g., acceleration error. After a particular signal value is adjusted in step 412, it may be immediately applied to the haptic actuator 110/310. If step 412 is again performed in later iterations, such as at t=3 ms, 4 ms, etc., the step may again involve adjusting the signal value of the first drive signal at those times in the same way. In an embodiment, step 412 may more generally involve determining a signal value of a drive signal to apply to the haptic actuator 110/310 at a particular instance in time based on the deviation in step 410. For instance, if step 412 is performed at a particular iteration corresponding to t=2 ms, the step may involve determining a signal value to apply to the haptic actuator during that iteration by adding a previous signal value that was most recently applied to the haptic actuator (e.g., at t=1 ms) by an amount that is based on acceleration error. The resulting signal value may be immediately applied to the haptic actuator 110/310. Similarly, if step 412 is applied again in later iterations (e.g., at t=3 ms, 4 ms, etc.), the step may involve determining a signal value to apply to the haptic actuator during each of those respective iterations by adding a previous signal value that was applied to the haptic actuator in a most recent iteration by an amount that is based on the acceleration error.

In step 414, the control circuit 140/240/340 may determine whether the first drive signal is over. For instance, step 406 may have generated a drive signal having a plurality of signal values, and the first drive signal is over when all of the plurality of signal values have been applied to the haptic actuator. If the first drive signal is over, the method 400 may come to an end. Otherwise, steps 408 to 414 may be repeated. In an embodiment, step 414 may determine whether a defined duration for the haptic effect has elapsed, which may cause method 400 to end.

Figure 6A:
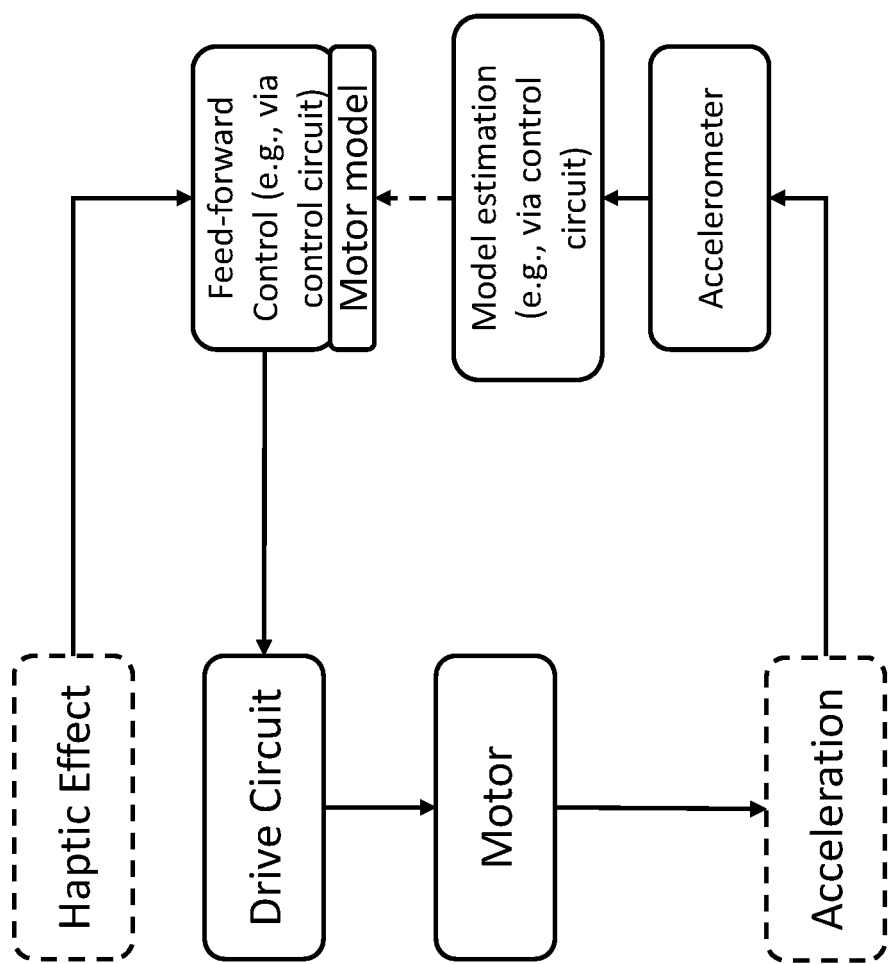
FIGS. 6A-6C provide diagrams that illustrate control of a haptic actuator based on an actuator model, according to an embodiment hereof.
Figure 6B:
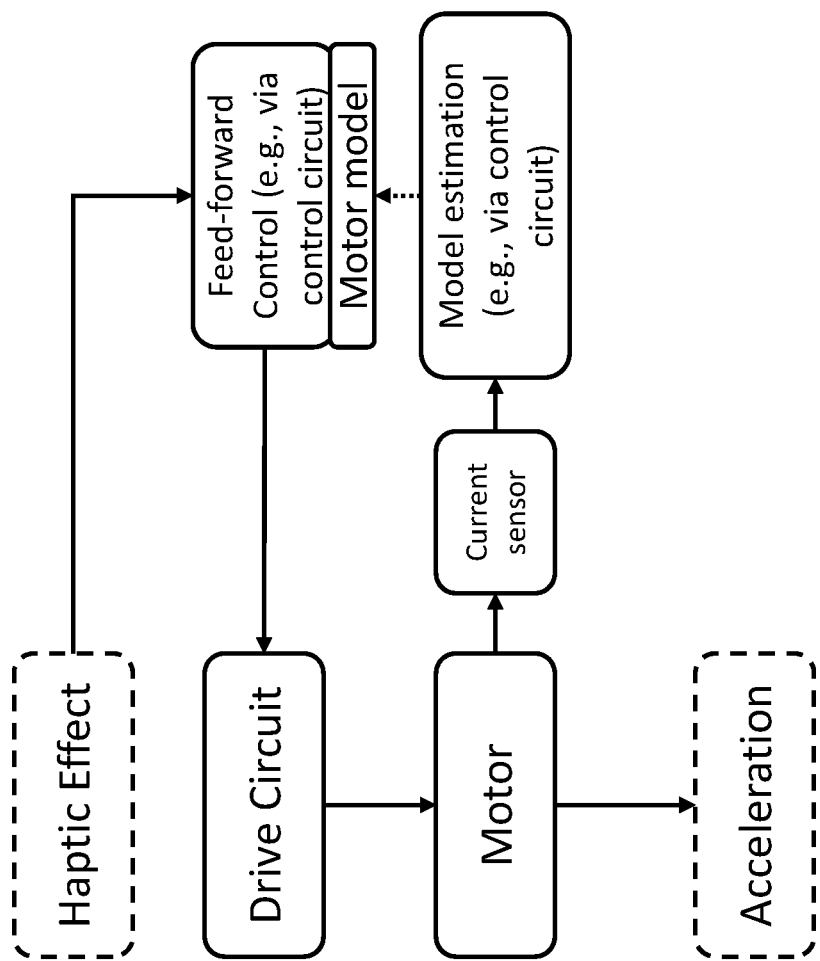
Figure 6C:
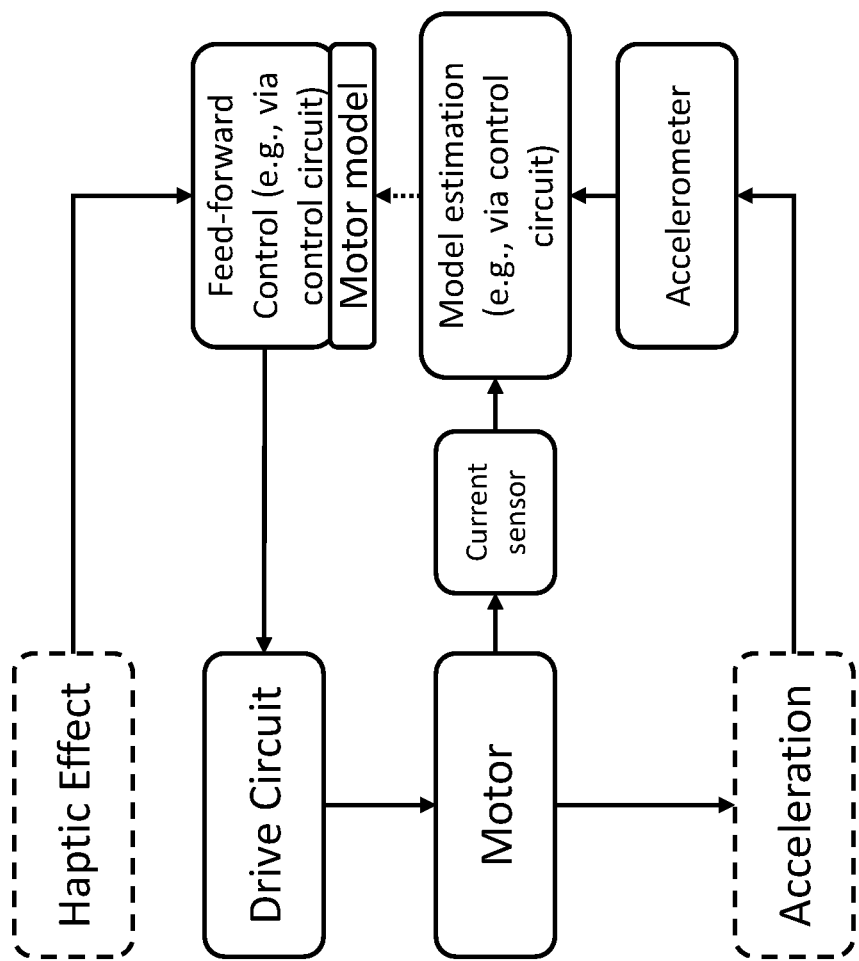

FIGS. 6A-6C include block diagrams that depict open-loop control, also referred to as feed forward (FF) control, of a haptic actuator that includes a motor. The motor may be controlled with only open-loop control, or may be controlled with a combination of open-loop control and closed loop control (e.g., a combination of open-loop and PD control). The open-loop control and/or the closed-loop control may be provided by the control circuit 140/340. For instance, the control circuit 140/340 may act as a FF controller. The FF controller may rely on an actuator model that is provided by a model estimation functionality. In an embodiment, the model estimation functionality may also be implemented by the FF controller. As discussed in more detail, the FF controller may generate or update an actuator model of the motor, and use the updated or generated actuator model to generate a drive signal (via a drive circuit) for the motor.

In an embodiment, the actuator model of FIGS. 6A-6C may be a motor model. The motor model may be specific to the particular motor being controlled by the control circuit, as opposed to being a general model for a type or class of motors. The motor model may describe how the particular motor responds to a drive signal. In some instances, the motor model may describe only a transient characteristic of the motor. In some instances, the motor model may describe both a transient characteristic and a steady state characteristic of the motor. In an embodiment, the FF controller may be configured to generate, from the motor model, an inverse transfer function whose input is a desired acceleration (either as a constant value or as a function of time) and whose output is a drive signal. The FF controller may use the inverse transfer function to generate the drive signal based on the desired acceleration for a particular haptic effect, and apply the drive signal to the motor to attempt to achieve the desired acceleration.

In the embodiment of FIG. 6A, the FF controller may perform the model estimation function based on a measurement from an accelerometer, which may describe an acceleration being output by the motor in response to a particular drive signal. In some implementations, the FF controller may execute the model estimation function every time a haptic effect is generated. In some implementations, the FF controller may execute the model estimation function periodically (e.g., every month). In some implementations, the FF controller may execute the model estimation function after a defined number of haptic effects (e.g., every fifty haptic effects) have been generated since a most recent execution of the model estimation function. The defined number may count all haptic effects that have been generated since the most recent execution of the model estimation function, or count only haptic effects that exceed a defined duration. In an embodiment, the FF controller may use the acceleration measurement to determine a new value for a parameter of the motor model, and update the motor model by averaging an old value for the parameter with the new value, wherein the averaged value becomes an updated value for the parameter. In some cases, the average may be a weighted average in which the new value has a greater weight than the old value, because the new value is based on a more recent acceleration measurement. In an embodiment, the FF controller may use the acceleration measurement to determine a new value for a parameter of the motor model, and replace an old value for the parameter with the new value, wherein the new value becomes the updated value.

FIG. 6B is similar to the embodiment of FIG. 6A, but includes a current sensor instead of an accelerometer. The FF controller may be configured to perform the model estimation function based on a measurement of electrical current flowing into the motor. FIG. 6C depicts an embodiment that includes both the current sensor and the accelerometer, in which the FF controller may be configured to perform the model estimation function based on the measurement of the acceleration and the measurement of the electrical current. In an embodiment, the motor model may describe an electrical transient characteristic of the motor (e.g., inductance), a mechanical transient characteristic of the motor (e.g., moment of inertia), an electromechanical transient characteristic of the motor, or any combination thereof. In an embodiment, the motor model may include a transfer function that relates an input that is a drive signal with an output that is a desired movement for a haptic effect, or an inverse transfer function that relates an input that is the desired movement to an output that is the drive signal.

Figure 7:
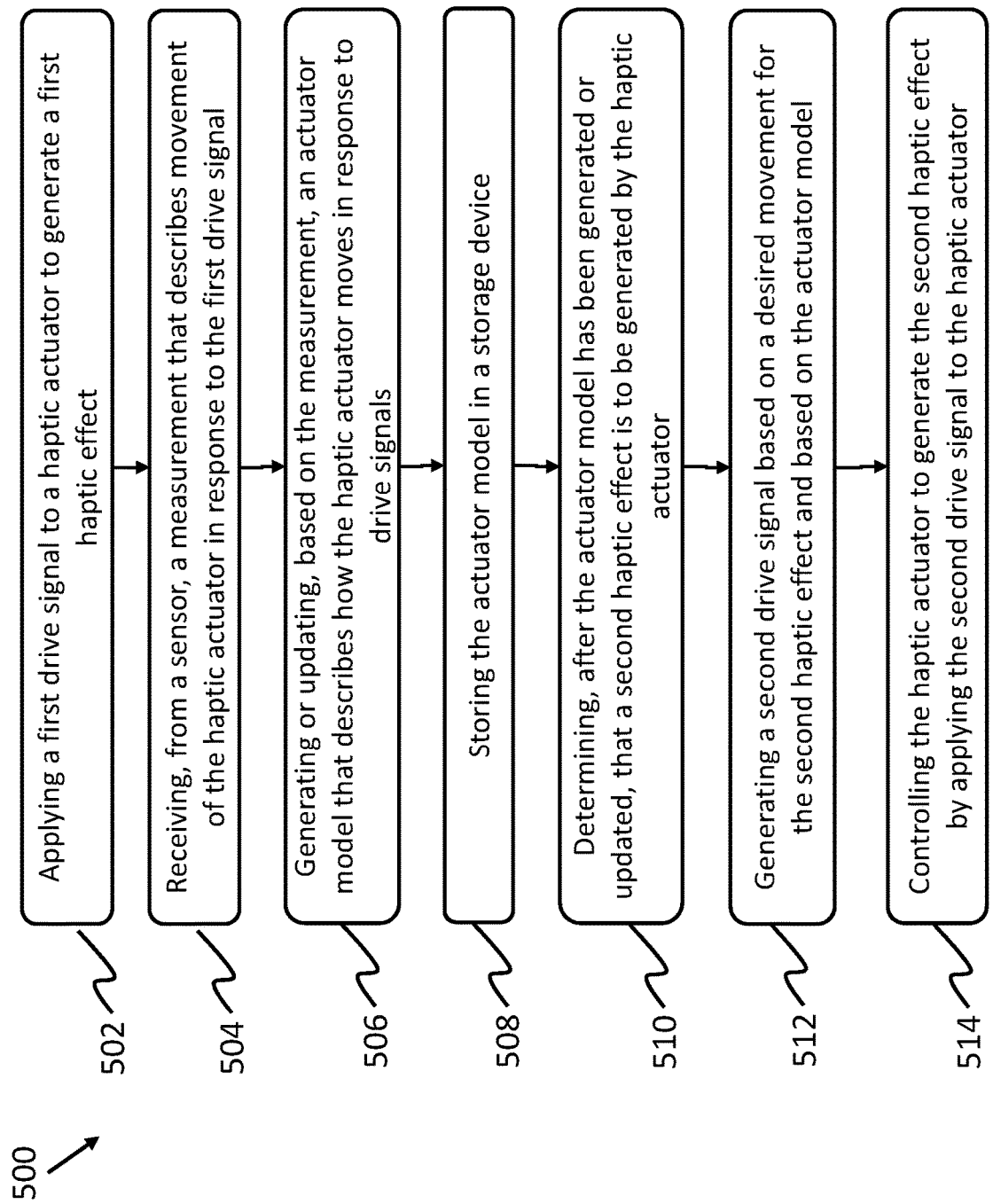
FIG. 7 illustrates a method for determining an actuator model and controlling a haptic actuator based on the actuator model, according to an embodiment hereof.

FIG. 7 illustrates a method 500 for performing actuator control with an actuator model of a haptic actuator. The method 500 may incorporate steps from method 400 (e.g., steps 408-414), or may be performed without incorporating steps of method 400. The method 500 may be performed by, e.g., the control circuit 140/240/340. In some cases, the control circuit 140/240/340 may be hard-wired to perform the actuator control. In some cases, the control circuit 140/240/340 may perform the actuator control by executing computer-executable instructions stored in a non-transitory computer-readable medium, such as storage device 350. The computer-executable instructions may be, e.g., code that is part of a device driver. In an embodiment, method 500 begins at step 502, in which the control circuit 140/240/340 applies a first drive signal to a haptic actuator 110/310 to generate a first haptic effect. The first drive signal may be a voltage signal, a current signal, or any other drive signal. The first drive signal may have a constant value, may include a plurality of pulses (wherein the pulses are separated by periods of zero current or zero voltage), may be a sinusoidal or other periodic signal, or may be any other drive signal. In some cases, a driver IC may be used to generate the first drive signal. The control circuit 140/240/340 may apply the first drive signal in response to a request (e.g., from an operating system running on a user interface device 300) specifically to determine an actuator model, or in response to a more general request to generate a haptic effect. For instance, the more general request may be from a user application (e.g., mobile app) executing on the user interface device 300, which may request that the first haptic effect is to be generated as part of the normal operation of user interface device 300, such as to provide notification to a user of the user interface device 300, to accompany visual content on the user interface device 300, or for some other purpose.

In step 504, the control circuit 140/240/340 receives, from a sensor 120/320, a measurement that describes movement of the haptic actuator 110/310 in response to the first drive signal. The sensor may be an accelerometer, an electrical current sensor, or any other sensor. In an embodiment, the measurement may describe an acceleration that is output by the haptic actuator 110/310 in response to the first drive signal. For instance, the measurement may describe an acceleration of a load of the haptic actuator 110/310, such as a touch screen panel being actuated by the haptic actuator 110/310, as a function of time. In an embodiment, the measurement may describe a velocity or a position of the load as a function of time.

Figure 8B:
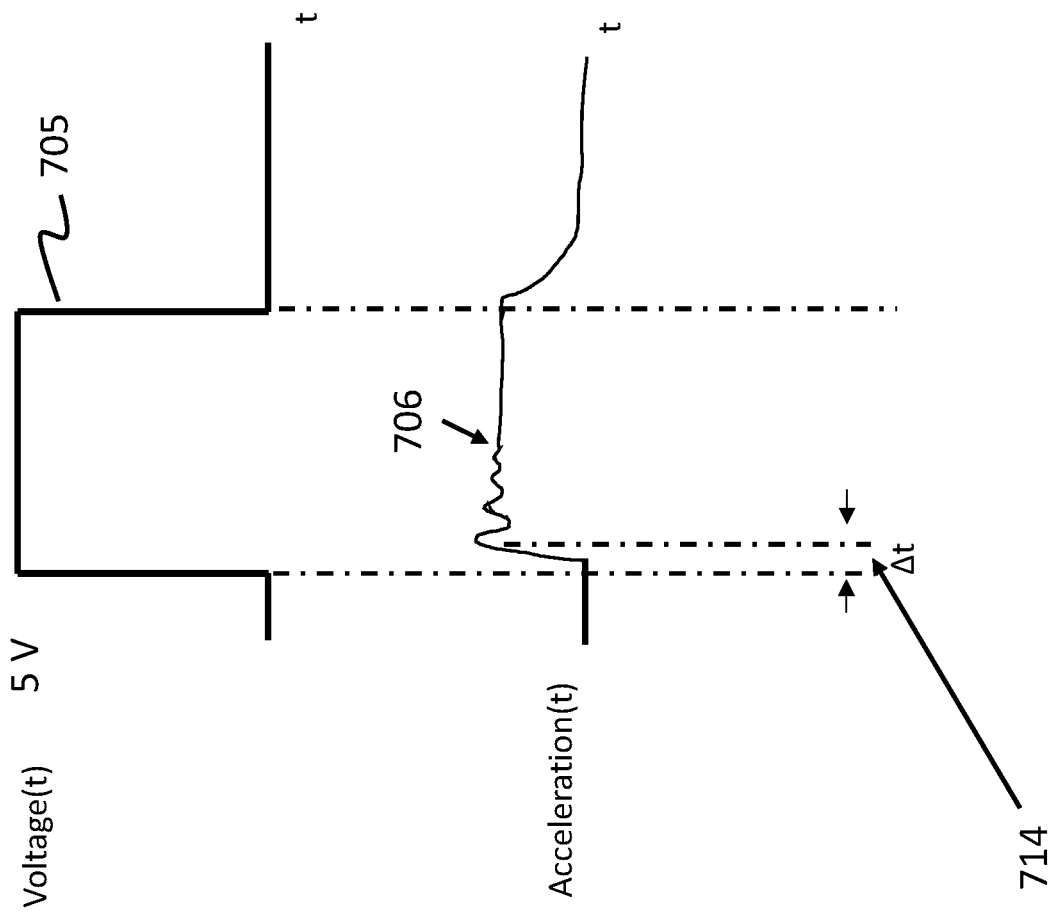
Figure 8C:
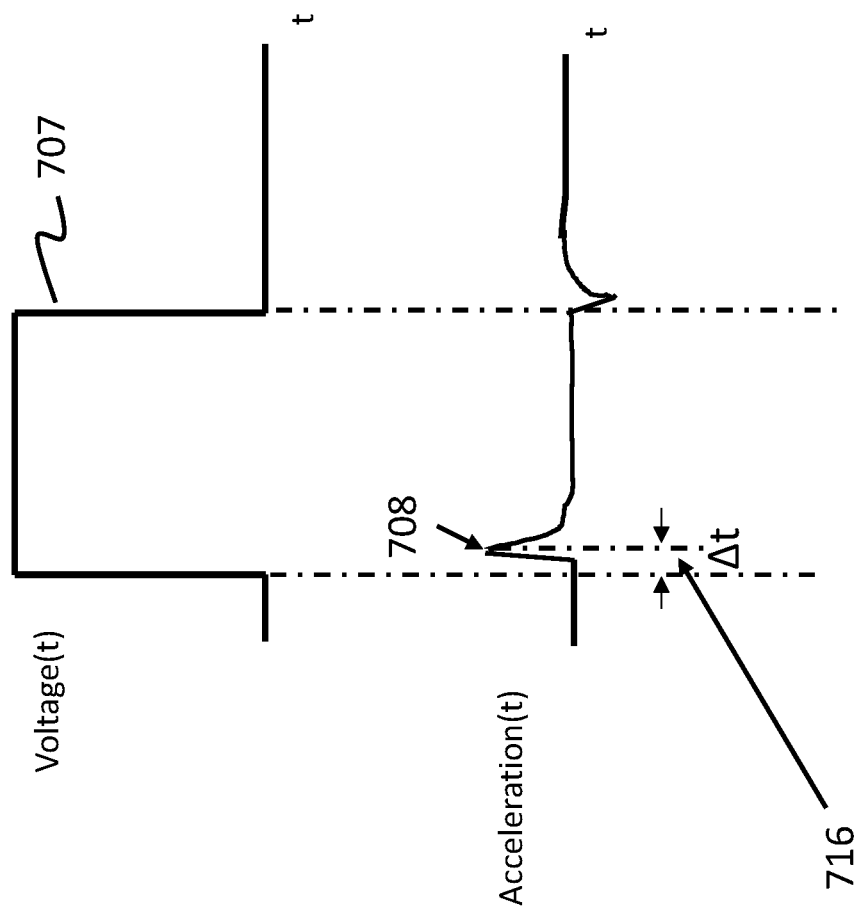

FIGS. 8A-8C depict examples of the first drive signal and of a measurement of acceleration that is output by a haptic actuator 110/310 in response to the first drive signal. In FIG. 8A, the first drive signal may be a 9V voltage signal 702 that is applied for a defined duration, e.g., 1 second. The measurement in FIG. 8A may include an acceleration waveform that describes an increase in acceleration being output by the haptic actuator until the acceleration from the haptic actuator 110/310 reaches a steady state portion 704. In an embodiment, the behavior of the acceleration may be based on a transient characteristic of the haptic actuator 110/310. The transient characteristic may describe, e.g., the acceleration or other behavior of the haptic actuator in a time period 712 before the acceleration of the haptic actuator has reached the steady state portion 704. As depicted in FIG. 8A, this time period 712 may have a duration of $\Delta t$. In an embodiment, the transient characteristic may include a parameter value that indicates how quickly the acceleration from the haptic actuator rises toward the steady state portion 704. For instance, the acceleration output by the haptic actuator may be approximately proportional to $(1-e^{-t/\tau})$, wherein t refers to time and $\tau$ refers to a time constant. In such an example, the transient characteristic may include the time constant $\tau$ as a parameter value. The parameter value $\tau$ may be used to calculate, e.g., how long it will take for the acceleration of the haptic actuator to reach a particular target value.

FIG. 8B illustrates another example in which the first drive signal is a 5V voltage signal 705, and an example of acceleration output by the haptic actuator 110/310 in response to the first drive signal. In an embodiment, the acceleration may include a steady state response portion 706 that includes oscillating behavior. For instance, the first drive signal may cause the acceleration of the haptic actuator 110/310 to initially overshoot a target value and then oscillate around the target value. In some cases, the transient characteristic may concern a response of the haptic actuator in a period 714 before the acceleration first reached the target value. The period after the acceleration crosses the target value may, in an embodiment, be considered part of the stead state portion 706.

FIG. 8C illustrates an example in which the first drive signal is a voltage signal 707, and in which the acceleration from the haptic actuator 110/310 has a peak response 708 (also referred to as a peak portion). The transient characteristic in this example may describe how the haptic actuator responds to the first drive signal in a period 716 before the acceleration from the haptic actuator has reached the peak response 708. For instance, the transient characteristic may describe a time $\Delta t$ needed to reach the peak response 708, a slope of the acceleration increase in the period 716, or any other transient characteristic.

Figure 8D:
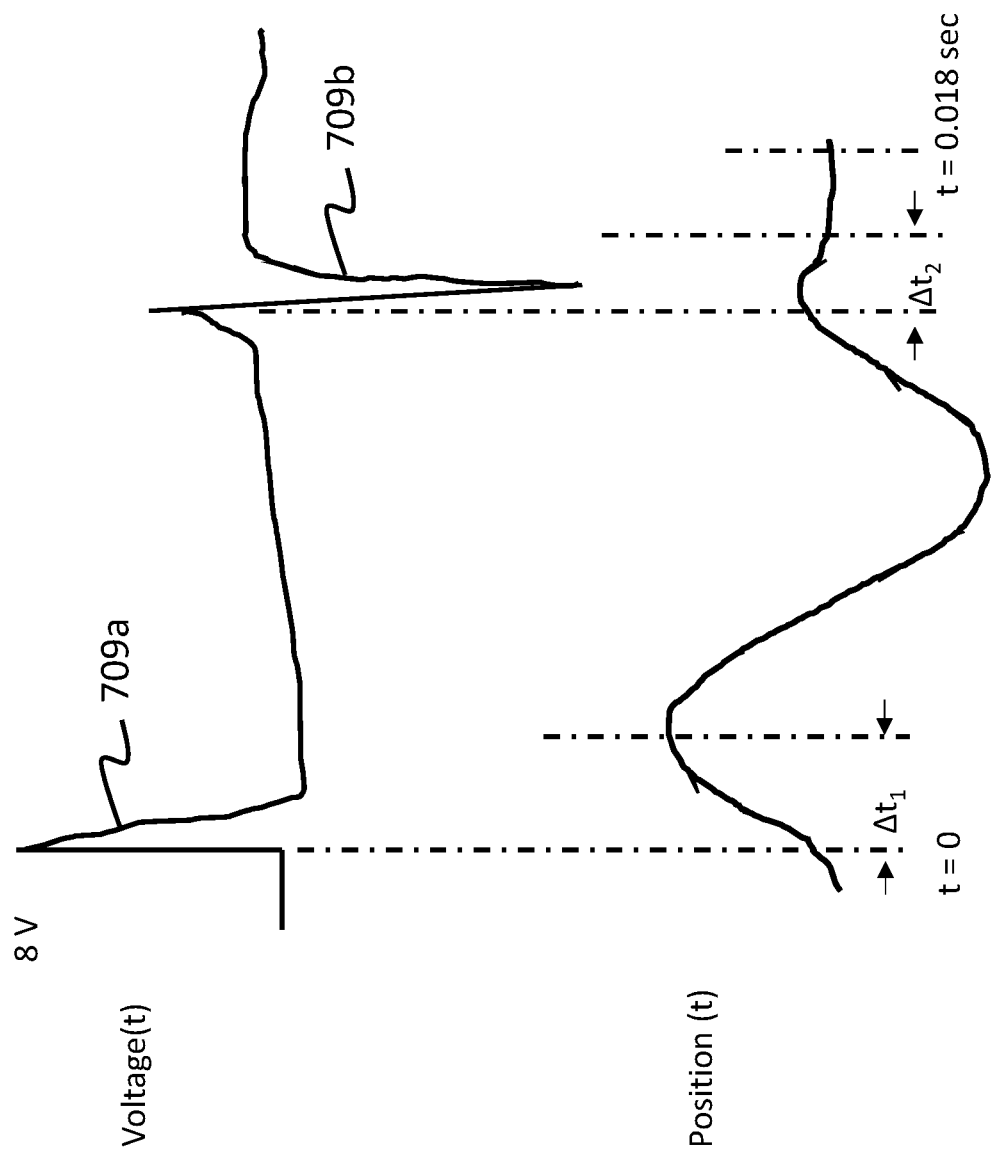

FIG. 8D depicts an example in which the first drive signal is a voltage signal that includes a kick-in portion 709a and a brake portion 709b. The kick-in portion 709a may, e.g., be a pulse having an amplitude (e.g., 8 V) greater than a voltage value or current value immediately preceding the kick-in portion 709a, and greater than a voltage value or current value immediately following the kick-in portion 709a. The brake portion 709b may have an opposite polarity than the kick-in portion 709a, but also have an amplitude that is greater than a voltage value or current value immediately preceding and immediately following the brake portion 709b. In an embodiment, the kick-in portion 709a may cause a load of the haptic actuator 110/310 to oscillate. In an embodiment, the transient characteristic may describe an amount of time $\Delta t_1$ from a start of the kick-in portion 709a to a time at which the load reaches a maximum displacement in its oscillation. The brake portion 709b may stop motion of the load. In an embodiment, the transient characteristic may describe an amount of time $\Delta t_2$ from a start of the brake portion 709b to a time at which motion of the load has stopped.

Returning to FIG. 7, in step 506 the control circuit 140/240/340 generates or updates, based on the measurement, an actuator model 160 that describes how the haptic actuator 110/310 moves in response to drive signals. In an embodiment, the haptic actuator 110/310 belongs to a first type of haptic actuator, and the actuator model 160 of the haptic actuator 110/310 is different than an actuator model of another haptic actuator that also belongs to the first type of haptic actuators. As stated above, the actuator model 160 may in an embodiment describe a transient characteristic of the haptic actuator 110/310. The transient characteristic may describe, e.g., how quickly the haptic actuator responds to drive signals. In some cases, the transient characteristic describes how quickly the haptic actuator reaches a steady state response or a peak response, or how quickly the haptic actuator reaches a defined proportion (e.g., 80%) of the steady state response or peak response, in response to drive signals. In an embodiment, the haptic actuator 110/310 includes a motor, and the actuator model 160 describes how the motor responds to drive signals. In an embodiment, the transient characteristic describes an inductance or a moment of inertia of the motor, wherein the drive signals are a plurality of voltage signals. In an embodiment, the haptic actuator 110/310 may have a nominal rise time that is a defined amount of time for an output of the haptic actuator to reach a peak response or steady state response, and the transient characteristic may describe movement of the haptic actuator in a time period that is shorter than the nominal rise time. That is, the time period may begin with a start of a drive signal, and the time period may have a duration shorter than the nominal rise time. In step 508, the control circuit 140/240/340 may store the actuator model 160 in a storage device 250/350.

Figure 9B:
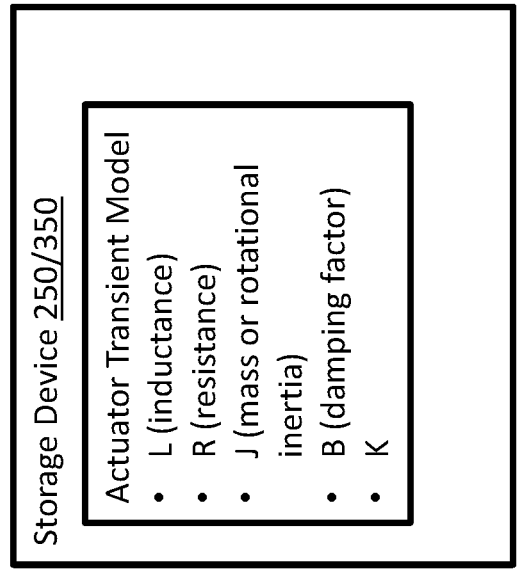
FIGS. 9A-9C illustrate example actuator models, according to embodiments hereof.
Figure 9A:
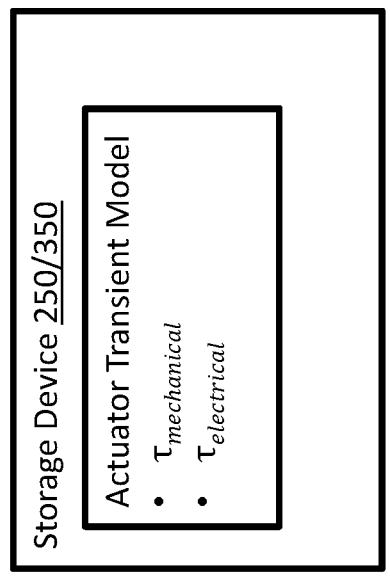
Figure 9C:
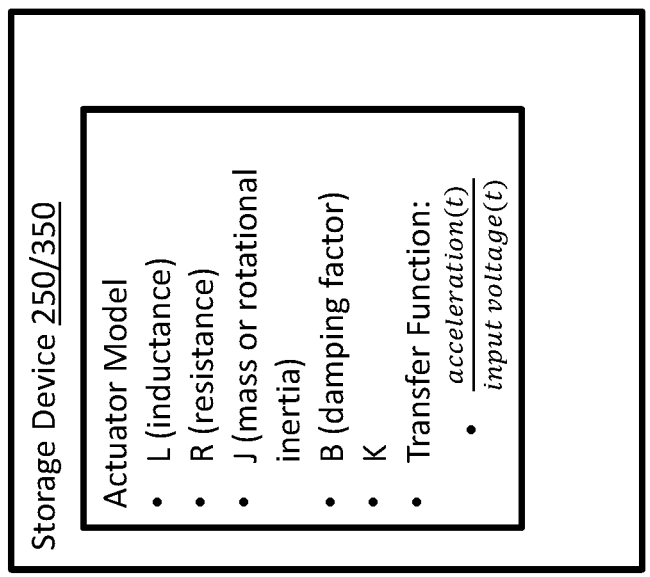

FIGS. 9A-9C illustrate various examples of a stored actuator model. More specifically, FIG. 9A illustrates a transient actuator model (also referred to as a transient response model) that describes or is indicative of a transient characteristic of the haptic actuator 110/310. In an embodiment, the actuator model describes an electrical transient characteristic and a mechanical transient characteristic of the haptic actuator 110/310. In FIG. 9A, the mechanical transient characteristic is described through a mechanical transient time constant $\tau_{mechanical}$ and, and the electrical transient characteristic is described through an electrical transient time constant $\tau_{electrical}$. In some cases, these time constants may be parameters of a function that describe how quickly the haptic actuator 110/310 begins drawing electrical current in response to a voltage signal (or how quickly the voltage signal drives electrical current into the haptic actuator 110/310), or how quickly acceleration increases after the electrical current generates a force or torque in the haptic actuator 110/310. In some cases, the electrical current being drawn may increase at a rate proportional to $$\left(1 - e^{\frac{-t}{\tau_{electrical}}}\right),$$

and the acceleration may increase at a rate proportional to $$\left(1 - e^{\frac{-t}{\tau_{mechanical}}}\right).$$

In an embodiment, the time constants may be equal to the $\tau$ or $\Delta t$ measured in FIGS. 8A through 8D, or may be derived from those measurements.

In FIG. 9B, the actuator model also includes respective values for parameters that describe an electrical characteristic or a mechanical characteristic of a haptic actuator 110/310. For instance, the parameters may include an inductance, resistance, mass, moment of inertia, or damping factor of the haptic actuator, and one or more constants K. In an embodiment, the inductance for the actuator model may be described based on a measurement from a current sensor, and the moment of inertia may be determined based on a measurement from an accelerometer. The inductance may describe a first time delay between a start of a voltage signal of the plurality of voltage signals being applied to the motor and a start of electrical current flowing into the motor in response to the voltage signal. The moment of inertia may describe a second time delay between a start of the electrical current generating a force or torque and a start of the motor outputting movement in response to the force or torque. In an embodiment, the constant K may represent, e.g., a spring constant, a constant between actuator speed and back-electromotive-force voltage $V_{emf}$, a constant that relates electrical current to force or torque, or any other constant that describes a characteristic of the haptic actuator. The haptic actuator 110/310 may have a characteristic that is described by, e.g., the inductance, resistance, and/or spring constant, and does not need to have an actual inductor, resistor, spring, or other component. In some cases, these parameters may represent inertial properties of the haptic actuator that creates a delayed response in the haptic actuator when a drive signal or other input is applied.

FIG. 9C provides an example of an actuator model that is like the actuator model in FIG. 9B, but that further includes a transfer function. The transfer function may, e.g., describe a ratio between an output of a haptic actuator 110/310 (e.g., acceleration) and an input to the haptic actuator 110/310 (e.g., drive signal). More generally speaking, the transfer function may describe the output of the haptic actuator as a function of the input. In an embodiment, the transfer function may be determined based on a measurement from an accelerometer. In some cases, the actuator model may include an inverse function, which describes an input of the haptic actuator 110/310 as a function of its output. The inverse transfer function may indicate what drive signal or other input needs to be applied to the haptic actuator 110/310 to achieve a desired acceleration or other output. The transfer function or inverse transfer function that is stored in the actuator model may be expressed in the time domain, as in FIG. 10C, in the frequency domain (e.g., the Laplace domain), or in some other manner. In an embodiment, the transfer function may be able to describe both transient characteristics and steady state characteristics of the haptic actuator 110/310.

In an embodiment, the transfer function may describe only transient characteristics of the haptic actuator 110/310. In an embodiment, the haptic actuator 110/310 belongs to a first type of haptic actuators, wherein the actuator model describes an amount of deviation between a measured value of a characteristic that describes how the haptic actuator 110/310 responds to drive signals and a nominal value for the characteristic. The nominal value may be a defined approximation of how haptic actuators belonging to the first type of haptic actuators respond to drive signals. For instance, the characteristic may be a rise time for the haptic actuator to reach a peak response in response to drive signals. In such an example, the actuator model describes an amount of deviation between a measured value for the rise time of the haptic actuator and a nominal value for the rise time.

Referring back to FIG. 7, method 500 may further include step 510, in which the control circuit 140/240/340 may determine, after the actuator model 160 has been generated or updated, that a second haptic effect is to be generated by the haptic actuator 110/310. In an embodiment, step 510 may be performed right after step 508. In an embodiment, step 510 may be performed a few hours or days after step 508. In an embodiment, the desired movement for the second haptic effect is an oscillation that has a duration equal to or less than two cycles. For instance, the haptic effect may have a duration of only 1.5 cycles. In an embodiment, the second haptic effect may be in response to a virtual button being clicked on a touch screen, such as a touch screen of a mobile phone or in-vehicle system. In an embodiment, the desired duration for the second haptic effect is shorter than a defined nominal rise time for the haptic actuator.

In step 512, the control circuit 140/240/340 generates a second drive signal based on a desired movement for the second haptic effect and based on the actuator model 160. In an embodiment, step 512 involves determining at least one of: an amplitude, duration, or duty cycle of the second drive signal based on the actuator model 160 of the haptic actuator 110/310. For instance, if the actuator model 160 describes an amount of deviation between a measured value for a rise time of the haptic actuator 110/310 and a nominal value for the rise time, the control circuit 140/240/340 may determine that the second drive signal is to include a kick-in portion at a beginning of the second drive signal. If the nominal rise time is associated with drive signals that have a first amplitude, the control circuit 140/240/340 may determine, based on the deviation, that the second drive signal is to have a second amplitude higher than the first amplitude. In an embodiment, if the actuator model 160 includes a damping factor for the haptic actuator 110/310, the control circuit 140/240/340 may be configured to determine, based on the damping factor, whether to include a brake portion for the second drive signal. In an embodiment, the control circuit 140/240/340 may be configured to increase an amplitude of the second drive signal relative to a defined baseline amplitude.

In step 514, the control circuit 140/240/340 controls the haptic actuator 110/310 to generate the second haptic effect by applying the second drive signal to the haptic actuator 110/310. In an embodiment, steps 512 and 514 are performed in a completely open-loop manner in which the second drive signal is not adjusted with real-time feedback. In an embodiment, the control circuit is configured to generate the second drive signal with closed-loop feedback by: receiving, from the sensor 120/320, a second measurement that describes movement of the haptic actuator in response to the second drive signal, and adjusting the second drive signal based on the second measurement, such that the second drive signal is generated based on a combination of the actuator model and the closed-loop feedback.

In an embodiment, the control circuit 140/240/340 may be configured to update the actuator model 160 by tracking how many haptic effects the haptic actuator has generated since the first haptic effect. The control circuit may determine that the haptic actuator has generated a defined number of haptic effects since the first haptic effect. In response to a determination that the haptic actuator has generated the defined number of haptic effects, the control circuit may update the actuator model by applying an additional drive signal and receiving, from the sensor, an additional measurement that describes movement of the haptic actuator in response to the additional drive signal, wherein the actuator model is updated based on the additional measurement.

Additional Discussion of Various Embodiments

Embodiment 1 of the present disclosure relates to a user interface device. The user interface device comprises a haptic actuator, a sensor, a storage device, and a control circuit. The sensor is configured to measure movement that is output by the haptic actuator. The control circuit is configured to apply a first drive signal to the haptic actuator to generate a first haptic effect, and to receive, from the sensor, a measurement that describes movement of the haptic actuator in response to the first drive signal. The control circuit is further configured to generate or update, based on the measurement, an actuator model that describes how the haptic actuator moves in response to drive signals, and to store the actuator model in the storage device. The control circuit is further configured to determine, after the actuator model has been generated or updated, that a second haptic effect is to be generated by the haptic actuator. The control circuit is also configured to generate a second drive signal based on a desired movement for the second haptic effect and based on the actuator model, and to control the haptic actuator to generate the second haptic effect by applying the second drive signal to the haptic actuator.

Embodiment 2 includes the user interface device of embodiment 1, wherein the actuator model describes a transient characteristic of the haptic actuator, wherein the transient characteristic describes how quickly the haptic actuator responds to drive signals.

Embodiment 3 includes the user interface device of embodiment 2, wherein the transient characteristic describes how quickly the haptic actuator reaches a steady state response or a peak response, or how quickly the haptic actuator reaches a defined proportion of the steady state response or peak response, in response to drive signals.

Embodiment 4 includes the user interface device of any one of embodiment 1-3, wherein the haptic actuator includes a motor, and wherein the actuator model describes how the motor responds to drive signals.

Embodiment 5 includes the user interface device of embodiment 4, wherein the transient characteristic describes an inductance or a moment of inertia of the motor, wherein the drive signals are a plurality of voltage signals. The inductance describes a first time delay between a start of a voltage signal of the plurality of voltage signals being applied to the motor and a start of electrical current flowing into the motor in response to the voltage signal. The moment of inertia describes a second time delay between a start of the electrical current generating a force or torque and a start of the motor outputting movement in response to the force or torque.

Embodiment 6 includes the user interface device of any one of embodiment 1-5, wherein the control circuit is configured to generate the second drive signal by determining at least one of: an amplitude, duration, or duty cycle of the second drive signal based on the actuator model of the haptic actuator.

Embodiment 7 includes the user interface device of any one of embodiment 1-6, wherein the haptic actuator belongs to a first type of haptic actuators, wherein the actuator model describes an amount of deviation between a measured value of a characteristic that describes how the haptic actuator responds to drive signals and a nominal value for the characteristic, wherein the nominal value is a defined approximation of how haptic actuators belonging to the first type of haptic actuators respond to drive signals.

Embodiment 8 includes the user interface device of embodiment 7, wherein the characteristic is a rise time for the haptic actuator to reach a peak response in response to drive signals, such that the actuator model describes an amount of deviation between a measured value for the rise time of the haptic actuator and a nominal value for the rise time, and wherein the control circuit is configured to determine, based on the amount of deviation between the measured value for the rise time of the haptic actuator and the nominal value for the rise time, whether the second drive signal is to include a kick-in portion at a beginning of the second drive signal.

Embodiment 9 includes the user interface device of embodiment 8, the actuator model describes the haptic actuator as having a longer measured rise time in response to drive signals having a first amplitude than a nominal rise time for haptic actuators of the first type in response to drive signals having the first amplitude, wherein the control circuit is further configured to determine that the kick-in portion is to have a second amplitude higher than the first amplitude.

Embodiment 10 includes the user interface device of embodiment 7, wherein the characteristic is an acceleration of the haptic actuator in response to drive signals.

Embodiment 11 includes the user interface device of any one of embodiments 1-10, wherein the desired movement for the second haptic effect is an oscillation that has a duration equal to or less than two cycles.

Embodiment 12 includes the user interface device of any one of embodiments 1-11, further comprising a touch screen configured to display a virtual button, wherein the second haptic effect is in response to the virtual button being clicked.

Embodiment 13 includes the user interface device of any one of embodiments 1-12, wherein the user interface device is a mobile phone or an in-vehicle system.

Embodiment 14 includes the user interface device of any one of embodiments 1-13, wherein a desired duration for the second haptic effect is shorter than a defined nominal rise time for the haptic actuator.

Embodiment 15 includes the user interface device of any one of embodiments 1-14, wherein the second drive signal is generated and applied to the haptic actuator in a completely open-loop manner in which the second drive signal is not adjusted with real-time feedback.

Embodiment 16 includes the user interface device of any one of embodiments 1-14, wherein the sensor is an accelerometer, and wherein the measurement is an acceleration that is output by the haptic actuator in response to the first drive signal.

Embodiment 17 includes the user interface device of any one of embodiments 1-14, wherein the control circuit is configured to generate the second drive signal with closed-loop feedback by: receiving, from the sensor or another sensor, an a second measurement that describes movement of the haptic actuator in response to the second drive signal, and adjusting the second drive signal based on the second measurement, such that the second drive signal is generated based on a combination of the actuator model and the closed-loop feedback.

Embodiment 18 includes the user interface device of any one of embodiments 1-17, further comprising a current sensor, wherein the first drive signal is a voltage drive signal, and wherein the control circuit is configured to receive, from the current sensor, a second measurement that describes a manner in which the voltage drive signal causes electrical current to flow into the haptic actuator, and wherein the control circuit is configured to determine the actuator model further based on the second measurement.

Embodiment 19 includes the user interface device of any one of embodiments 1-18, wherein the control circuit is configured to track how many haptic effects the haptic actuator has generated since the first haptic effect. The control circuit is further configured to determine that the haptic actuator has generated a defined number of haptic effects since the first haptic effect. In response to a determination that the haptic actuator has generated the defined number of haptic effects, the control circuit is configured to update the actuator model by applying an additional drive signal and receiving, from the sensor, an additional measurement that describes movement of the haptic actuator in response to the additional drive signal. The actuator model is updated based on the additional measurement.

Embodiment 20 relates to a method of controlling a haptic actuator. The method is performed by a control circuit and comprises applying a first drive signal to the haptic actuator to generate a first haptic effect, and receiving, from a sensor, a measurement that describes movement of the haptic actuator in response to the first drive signal. The method further includes generating or updating, based on the measurement, an actuator model that describes how the haptic actuator moves in response to drive signals, and storing the actuator model in a storage device. The method also comprises determining, after the actuator model has been generated or updated, that a second haptic effect is to be generated by the haptic actuator. The method also comprises generating a second drive signal based on a desired movement for the second haptic effect and based on the actuator model, and controlling the haptic actuator to generate the second haptic effect by applying the second drive signal to the haptic actuator. In the embodiment, the haptic actuator belongs to a first type of haptic actuator, and wherein the actuator model of the haptic actuator is different than an actuator model of another haptic actuator that also belongs to the first type of haptic actuators.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A user interface device, comprising:
   a haptic actuator;
   a sensor configured to measure movement that is output by the haptic actuator;
   a storage device;
   a control circuit configured
      to apply a first drive signal to the haptic actuator to generate a first haptic effect,
      to receive, from the sensor, a measurement that describes movement of the haptic actuator in response to the first drive signal;
      to generate or update, based on the measurement, an actuator model that describes how the haptic actuator moves in response to drive signals;
      to store the actuator model in the storage device;
      to determine, after the actuator model has been generated or updated, that a second haptic effect is to be generated by the haptic actuator,
      to generate a second drive signal based on a desired movement for the second haptic effect and based on the actuator model, wherein the second drive signal is generated and applied to the haptic actuator in a completely open-loop manner in which the second drive signal is not adjusted with real-time closed-loop feedback, and
      to control the haptic actuator to generate the second haptic effect by applying the second drive signal to the haptic actuator.

2. The user interface device of claim 1, wherein the actuator model describes a transient characteristic of the haptic actuator, wherein the transient characteristic describes how quickly the haptic actuator reaches a steady state response or a peak response, or how quickly the haptic actuator reaches a defined proportion of the steady state response or peak response, in response to drive signals.

3. The user interface device of claim 1, wherein the haptic actuator includes a motor, and wherein the actuator model describes how the motor responds to drive signals.

4. The user interface device of claim 3, wherein the actuator model describes a transient characteristic of the haptic actuator, wherein the transient characteristic describes an inductance or a moment of inertia of the motor, wherein the drive signals are a plurality of voltage signals,
   wherein the inductance describes a first time delay between a start of a voltage signal of the plurality of voltage signals being applied to the motor and a start of electrical current flowing into the motor in response to the voltage signal, and
   wherein the moment of inertia describes a second time delay between a start of the electrical current generating a force or torque and a start of the motor outputting movement in response to the force or torque.

5. The user interface device of claim 1, wherein the control circuit is configured to generate the second drive signal by determining at least one of: an amplitude, duration, or duty cycle of the second drive signal based on the actuator model of the haptic actuator.

6. The user interface device of claim 1, wherein the haptic actuator belongs to a first type of haptic actuators, wherein the actuator model describes an amount of deviation between a measured value of a characteristic that describes how the haptic actuator responds to drive signals and a nominal value for the characteristic, wherein the nominal value is a defined approximation of how haptic actuators belonging to the first type of haptic actuators respond to drive signals.

7. The user interface device of claim 6, wherein the characteristic is a rise time for the haptic actuator to reach a peak response in response to drive signals, such that the actuator model describes an amount of deviation between a measured value for the rise time of the haptic actuator and a nominal value for the rise time, and wherein the control circuit is configured to determine, based on the amount of deviation between the measured value for the rise time of the haptic actuator and the nominal value for the rise time, whether the second drive signal is to include a kick-in portion at a beginning of the second drive signal.

8. The user interface device of claim 7, the actuator model describes the haptic actuator as having a longer measured rise time in response to drive signals having a first amplitude than a nominal rise time for haptic actuators of the first type in response to drive signals having the first amplitude, wherein the control circuit is further configured to determine that the kick-in portion is to have a second amplitude higher than the first amplitude.

9. The user interface device of claim 6, wherein the characteristic is an acceleration of the haptic actuator in response to drive signals.

10. The user interface device of claim 1, wherein the desired movement for the second haptic effect is an oscillation that has a duration equal to or less than two cycles.

11. The user interface device of claim 10, further comprising a touch screen configured to display a virtual button, wherein the second haptic effect is in response to the virtual button being clicked.

12. The user interface device of claim 11, wherein the user interface device is a mobile phone or an in-vehicle system.

13. A user interface device, comprising:
a haptic actuator;
a sensor configured to measure movement that is output by the haptic actuator;
a storage device;
a control circuit configured
to apply a first drive signal to the haptic actuator to generate a first haptic effect,
to receive, from the sensor, a measurement that describes movement of the haptic actuator in response to the first drive signal;
to generate or update, based on the measurement, an actuator model that describes how the haptic actuator moves in response to drive signals;
to store the actuator model in the storage device;
to determine, after the actuator model has been generated or updated, that a second haptic effect is to be generated by the haptic actuator,
to generate a second drive signal based on a desired movement for the second haptic effect and based on the actuator model, and
to control the haptic actuator to generate the second haptic effect by applying the second drive signal to the haptic actuator,
wherein a duration for the second haptic effect is shorter than a defined nominal rise time for the haptic actuator.

14. The user interface device of claim 1, wherein the sensor is an accelerometer, and wherein the measurement is an acceleration that is output by the haptic actuator in response to the first drive signal.

15. The user interface device of claim 1, further comprising a current sensor, wherein the first drive signal is a voltage drive signal, and wherein the control circuit is configured to receive, from the current sensor, a second measurement that describes a manner in which the voltage drive signal causes electrical current to flow into the haptic actuator, and wherein the control circuit is configured to determine the actuator model further based on the second measurement.

16. The user interface device of claim 1, wherein the control circuit is configured
to track how many haptic effects the haptic actuator has generated since the first haptic effect,
to determine that the haptic actuator has generated a defined number of haptic effects since the first haptic effect,
in response to a determination that the haptic actuator has generated the defined number of haptic effects, to update the actuator model by applying an additional drive signal and receiving, from the sensor, an additional measurement that describes movement of the haptic actuator in response to the additional drive signal, wherein the actuator model is updated based on the additional measurement.

17. A method of controlling a haptic actuator, the method being performed by a control circuit and comprising:
applying a first drive signal to the haptic actuator to generate a first haptic effect, receiving, from a sensor, a measurement that describes movement of the haptic actuator in response to the first drive signal;
generating or updating, based on the measurement, an actuator model that describes how the haptic actuator moves in response to drive signals;
storing the actuator model in a storage device;
determining, after the actuator model has been generated or updated, that a second haptic effect is to be generated by the haptic actuator;
generating a second drive signal based on a desired movement for the second haptic effect and based on the actuator model, wherein the second drive signal is generated and applied to the haptic actuator in a completely open-loop manner in which the second drive signal is not adjusted with real-time closed-loop feedback, and
controlling the haptic actuator to generate the second haptic effect by applying the second drive signal to the haptic actuator.

18. The method of claim 17, wherein the haptic actuator belongs to a first type of haptic actuator, and wherein the actuator model of the haptic actuator is different than an actuator model of another haptic actuator that also belongs to the first type of haptic actuators.

* * * * *